United States Patent
Zhang et al.

(10) Patent No.: US 11,537,733 B2
(45) Date of Patent: Dec. 27, 2022

(54) DATABASE ACCESS CONTROL SERVICE IN NETWORKS

(71) Applicants: Hang Zhang, Nepean (CA); Bidi Ying, Ottawa (CA)

(72) Inventors: Hang Zhang, Nepean (CA); Bidi Ying, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 194 days.

(21) Appl. No.: 16/920,623

(22) Filed: Jul. 3, 2020

(65) Prior Publication Data
US 2022/0004655 A1    Jan. 6, 2022

(51) Int. Cl.
| | |
|---|---|
| G06F 21/62 | (2013.01) |
| H04L 9/40 | (2022.01) |
| G06F 21/60 | (2013.01) |
| G06F 16/28 | (2019.01) |
| H04L 9/08 | (2006.01) |

(52) U.S. Cl.
CPC ........ *G06F 21/6218* (2013.01); *G06F 16/285* (2019.01); *G06F 21/602* (2013.01); *H04L 9/0861* (2013.01); *H04L 9/0894* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 10,530,578 B2* | 1/2020 | Keshava | G06F 12/1466 |
| 2003/0167269 A1* | 9/2003 | Gupta | G06F 21/6218 |
| | | | 707/999.009 |
| 2010/0257351 A1* | 10/2010 | O'Connor | G06F 21/606 |
| | | | 713/150 |
| 2014/0090085 A1 | 3/2014 | Mattsson et al. | |
| 2017/0041296 A1* | 2/2017 | Ford | G06F 16/951 |
| 2018/0082079 A1 | 3/2018 | Burckard | |

FOREIGN PATENT DOCUMENTS

CN    106326758 A    1/2017

OTHER PUBLICATIONS

Arjmand Samuel et al., A Framework for Composition and Enforcement of Privacy-Aware and Context-Driven Authorization Mechanism for Multimedia Big Data, IEEE Transactions on Multimedia, vol. 17, No. 9, Sep. 2015, total 11 pages.
(Continued)

*Primary Examiner* — Brandon Hoffman

(57) ABSTRACT

A system supporting a networked database service includes a controller configured to receive one or more data request and authenticate the one or more data request. A gateway (GW) in communication with the controller, is configured to receive at least one of the one or more data request from the controller, perform data classification on data received in the request, and generate a cryptographic key based on the data classification, a hardware-protected key of the GW, and a second (encryption) key. The cryptographic key is for accessing a database. The controller and the GW are operated by different parties.

18 Claims, 20 Drawing Sheets

(56) References Cited

OTHER PUBLICATIONS

Wenxiu Ding et al, Privacy-Preserving Data Processing with Flexible Access Control, IEEE Transactions on Dependable and Secure Computing (vol. 17, Issue: 2, Mar.-Apr. 1, 2020), total 15 pages.
Lee, Jong-Hyouk. BIDaaS: Blockchain Based ID as a Service, IEEE Access, Dec. 12, 2017, p. 2274-2278, vol. 6.
Asamoah, K. et al., Zero-Chain: A Bockchain-Based Identity for Digital City Operating System, IEEE Internet of Things Journal, vol. 7, No. 10, Oct. 2020, p. 10336-10346.

* cited by examiner

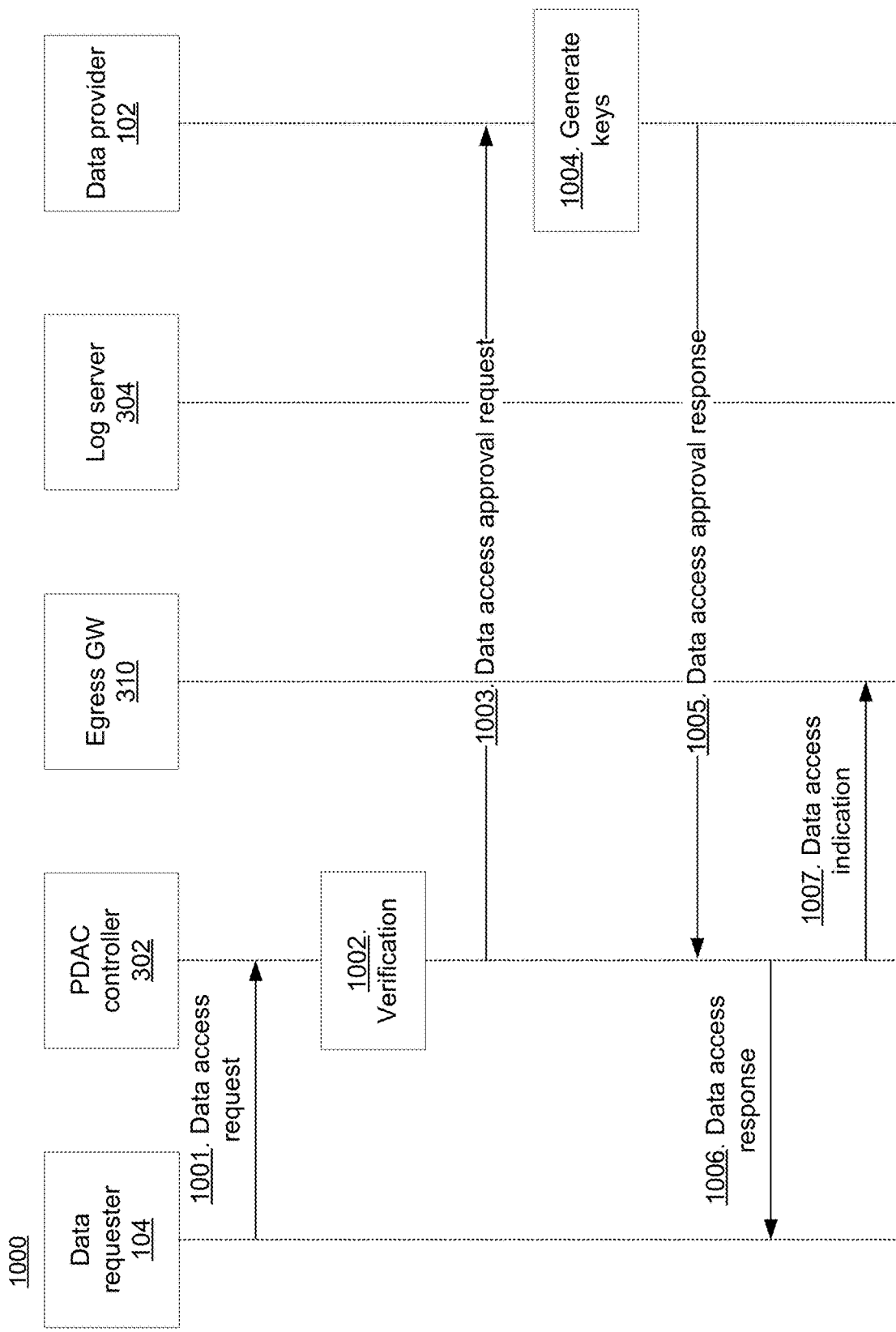

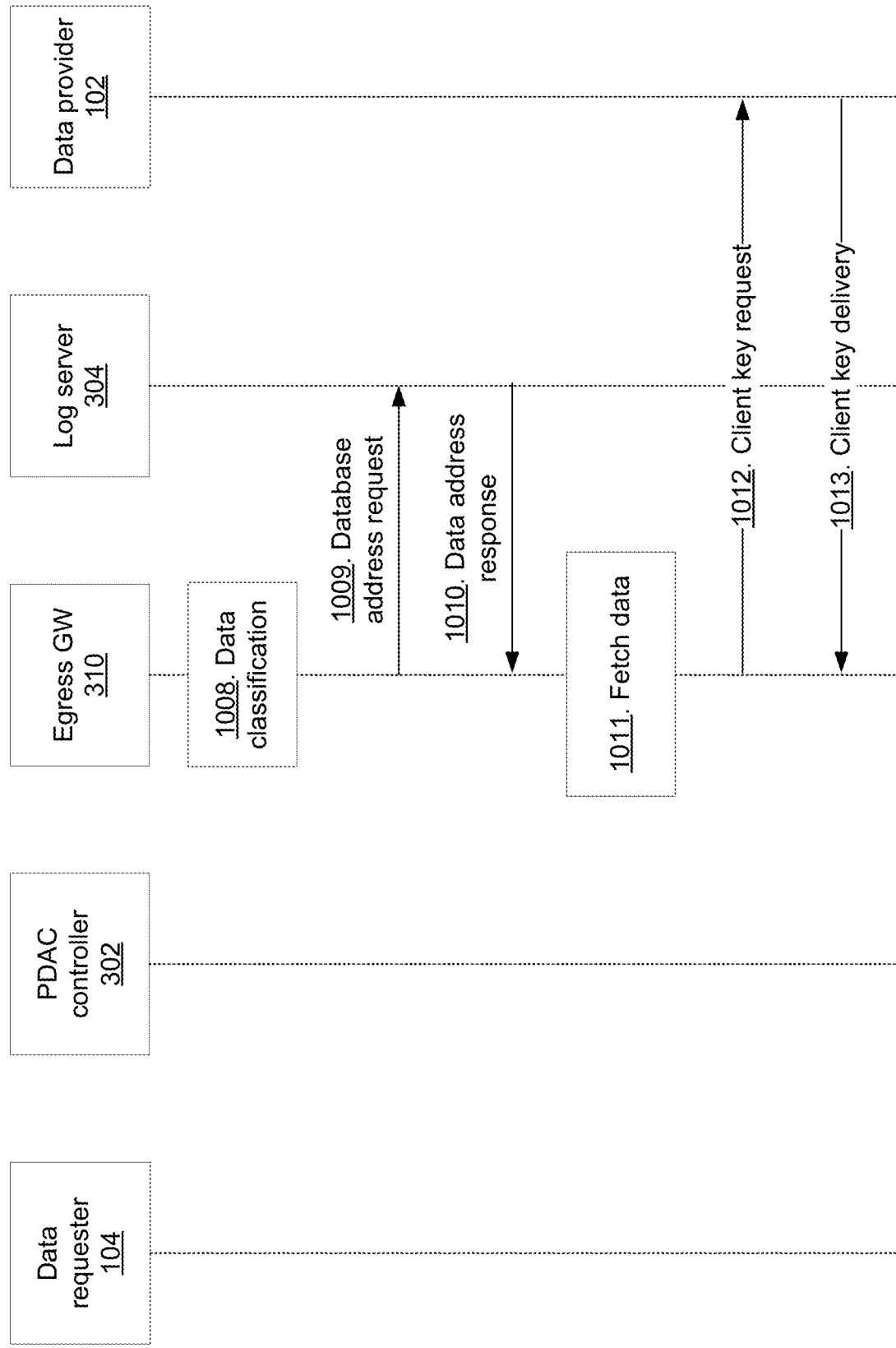

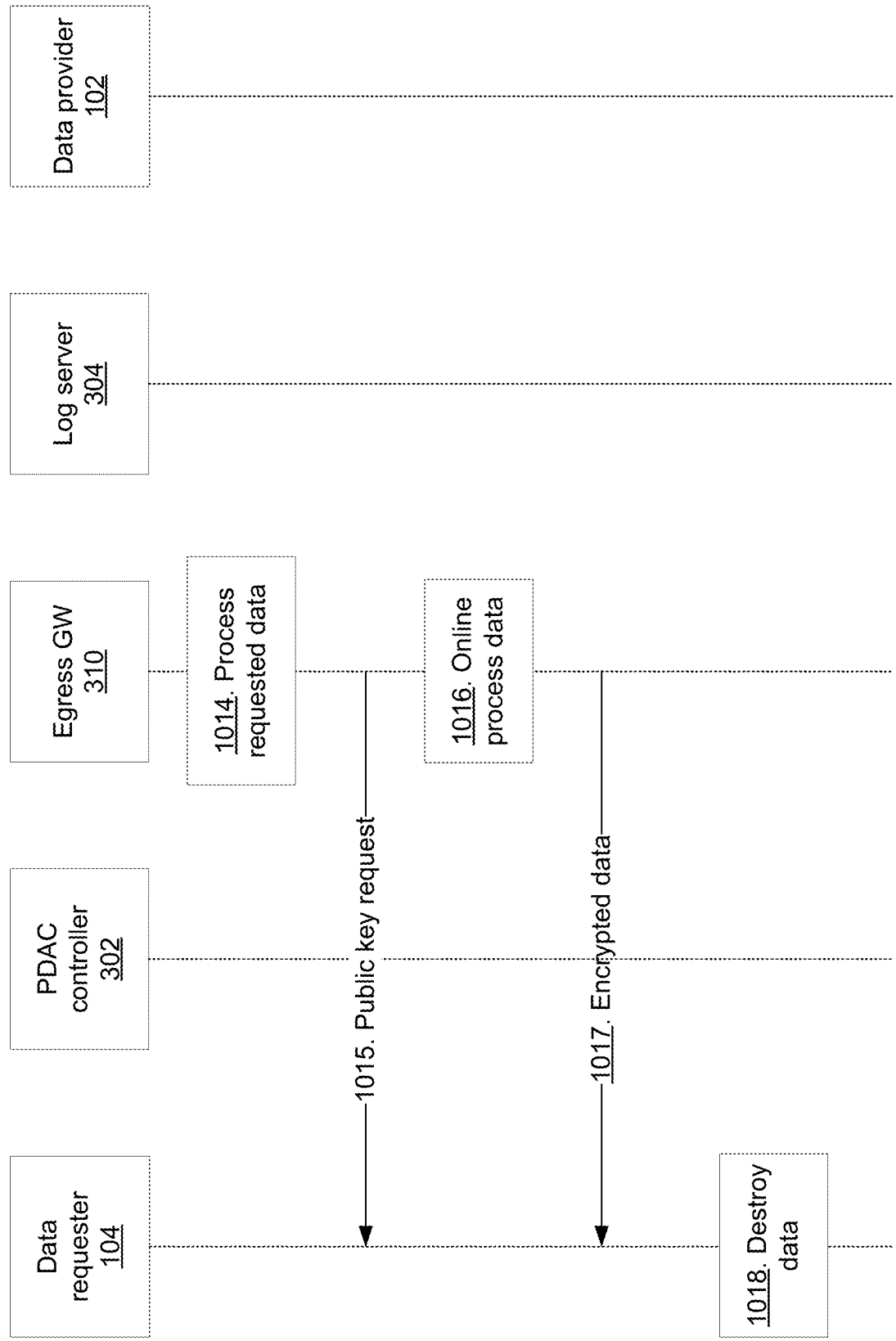

1100

Table 1: Data classification in security level

| Security level | | | | | |
|---|---|---|---|---|---|
| Commercial data 1102 | sensitive | confidential | private | proprietary | public |
| | 1100 | 1101 | 1010 | 1001 | 1000 |
| Government data 1104 | top secret | secret | confidential | sensitive | unclassified |
| | 0100 | 0011 | 0010 | 0001 | 0000 |

Table 2: Data classification in data characteristics

| Data characteristics | | Value |
|---|---|---|
| Commercial data 1102 | Business data | 10000 |
| | Personal data | 10001 |
| | Social data | 10010 |
| | Health data | 10011 |
| | Environment data | 10100 |
| | other | ... |
| Government data 1104 | Personal identification data | 00000 |
| | Military data | 00001 |
| | Policy/law data | 00010 |
| | Community data | 00011 |
| | other | ... |

FIG. 12

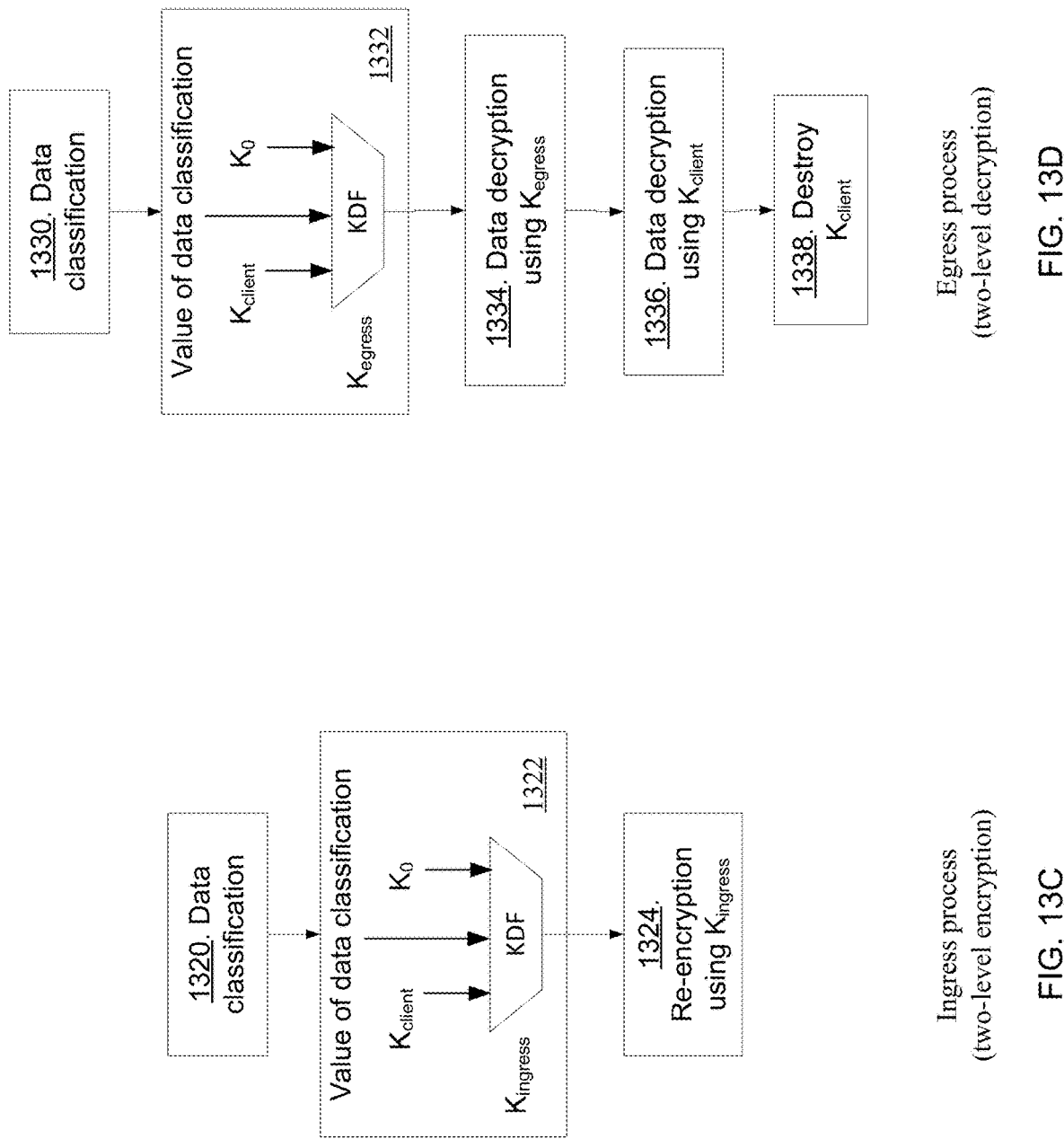

DATABASE ACCESS CONTROL SERVICE IN NETWORKS

CROSS-REFERENCE TO RELATED APPLICATIONS

This is the first application filed for the present invention.

FIELD OF THE INVENTION

The present invention pertains to database access control, and in particular to methods and systems for preserving privacy when accessing databases in networked environments.

BACKGROUND

Data outsourcing or "database as a service" (DBaaS) is a new paradigm for data management in which a third party service provider hosts a database as a service. DBaaS provides data management for its customers or clients. A DBaaS provides the benefits that a customer does not have to purchase or provide their own hardware, do not have to install database software or manage the database themselves, and do not have to concern themselves with necessary upgrades and backups to ensuring that the database system remains available and secure.

DBaaS also allows for several parties to share and collaborate with providing and accessing data. The involved parties of a DBaaS include data providers, data requestors, database providers, and a DBaaS service provider. A data provider is an entity that is supplying data to be stored in the database. The data uploaded to the database may be confidential or proprietary to the data provider. A data requestor is an entity asking for access to data or data driven reports from the stored data. The database provider provides the database storage and database engine which, in many applications, will be a cloud computing provider. The database provider will be expected to preserve the privacy and confidentiality of the data provided by the data provider. The database provider will also be expected to restrict access to data to the data requestor consistent with permissions granted to the data requestor. The DBaaS service provider must manage access to the data and preserve the privacy, confidentiality, and access permissions of all parties, including themselves. In some embodiments all of these parties may be separate entities. In other embodiments, a single entity may perform the role of multiple parties.

Current solutions used to preserve confidentiality may be referred to as zero-knowledge privacy, relying on a key manager, and asymmetric encryption.

When using zero-knowledge privacy, the database provider offers zero-knowledge privacy where data providers encrypt their own data and upload encrypted data to the database. The database provider has no knowledge of the data or access to the data encryption keys. Examples of database providers offering zero-knowledge privacy include cloud service providers, Tresorit, pCloud AG, and Sync.com Inc. If the servers are accessed without permission, the data is still inaccessible to anyone but the data provider since only they have the encryption keys. However, if the data provider wants to share its data with a data requestor or a third party, the data provider must download the data from the database and send it securely to the data requestor or third party. This process consumes network resources and is impractical in cases where the data provider is using a mobile device such as a smart phone or tablet, or from an Internet of things (IoT) device.

Some applications rely on encrypting data using a third party or agent that stores and retrieves shared keys from storage that is separate from the data. An external key server or key manager may be used and may also generate the encryption keys themselves. Examples include Vormetric Transparent Encryption and Trend Micro Inc.'s Securecloud. This allows data requestors to download and decrypt data using encryption keys from the third party, agent, or key manager. However, malicious data requestors may access the database and retrieve the data provider's data using the same shared key without the data provider's authorization.

Asymmetric encryption has also been proposed as a solution. Asymmetric encryption allows a semi-trusted proxy to convert data encrypted under a public key of one user to be decrypted by another user's private key. However, in order to satisfy long term security requirements large, 4096-bit or 8192-bit, asymmetric keys are needed which makes it impractical to encrypt data on some user devices with limited storage and computing power.

There exists a need for data management solutions that protect the confidentiality of the data provider's data, ensures that data requestor's and database providers are authorized and authenticated before allowing access to data, and provide a trusted third-party to independently manage the DBaaS system.

This background information is provided to reveal information believed by the applicant to be of possible relevance to the present invention. No admission is necessarily intended, nor should be construed, that any of the preceding information constitutes prior art against the present invention.

SUMMARY

Embodiments of the invention provide a system for implementing "privacy database access control" (PDAC) and enabling the offering of PDAC as a service (PDACaaS) to data providers, data requestors, database providers, and DBaaS service providers. Embodiments also provide methods to implement an architecture to provide a PDACaaS that protects and enhances the privacy of data providers with authentication and access controls for accessing data stored in the database. Embodiments provide database access controls with customizable security levels to satisfy various security requirements of the parties involved.

In accordance with embodiments of the present invention, there is provided a system includes a controller configured to receive one or more data request and authenticate the one or more data request. Such a system further includes a gateway (GW) in communication with the controller. The GW is configured to receive a response corresponding to at least one of the one or more data request from the controller; receive data from a data provider, perform data classification on the data according to the response to obtain a classification result, and generate a cryptographic key for accessing a database, the cryptographic key based on the classification result, a hardware-protected key in the GW, and a key from the data provider. The cryptographic key is for accessing a database. The controller and the database are operated by different parties.

This embodiment of the system serves to decouple the data storage service from the access control service. This allows these two services, the storing of data and access/control over the data, to be provided by different entities enhancing the security and privacy of the data. This embodiment also serves to provide security levels customized to a characteristic of the data.

In further embodiments, the GW is an ingress GW, the one or more data request includes a data upload request, and the ingress GW is further configured to send the data upload request to the controller, encrypt the data based on the cryptographic key, and send the encrypted data to the database for storage. This embodiment serves to ensure secure communication between a provider of the data and the system.

In further embodiments, the one or more data request includes a data access request from a data requester. The controller is further configured to provide authentication and authorization of the data access request and send a data indication to an egress GW. The system further includes an egress GW configured to perform data classification on the received data indication to obtain a second classification result receive data from the database; and generate a decryption key based on the second classification result, a hardware-protected key of the egress GW, and the key from the data provider. The egress GW uses the decryption key for accessing the database to provide the data requested in the data access request. For example, the egress GW decrypts the data based on the decryption key, and provides the decrypted data to the data requester This embodiment serves to ensure secure communication between the system and an entity requesting access to the data. In further embodiments the ingress GW, the egress GW and the controller are operated by the same party, which differs from the party operating the database In further embodiments the data received by the ingress GW is encrypted data from the data provider. In further embodiments, the ingress GW is further configured to decrypt the encrypted data from the data provider based on the key from the data provider to obtain decrypted data, wherein the data encrypted by the ingress GW is the decrypted data In further embodiments the egress GW is configured to decrypt the data by perform a decryption of the data based on the decryption key and the key from the data provider. In further embodiments, the system further includes a data distribution center configured to: receive the encrypted data from the ingress GW, and select the database to store the encrypted data, and store an address of the database into a log server, and the ingress GW is configured to send the encrypted data to the database for storage by sending the encrypted data via the data distribution center to the database for storage. In further embodiments the controller is further configured to authenticate the data provider via an authentication center. In further embodiments, the controller is configured to perform the authorization on the data access request by confirming with the data provider that the data access request is authorized.

In further embodiments, the database is one of a plurality of databases configured to receive the data. Each of the plurality of databases includes one of a plurality of ingress GWs and one of a plurality of egress GWs, and the controller is configured to select the database from the plurality of databases. This embodiment provides a multiple layer system that can be used to increase the performance and reliability of the system. In further embodiments, the ingress GW is configured to send the encrypted data to the database for storage by sending the data to a data distribution center for sending the data to the database for storage. This embodiment may serve to increase the performance of the system when sending data to the database by more efficiently managing the databases. In further embodiments, the pro-vider of the data is authenticated by the controller using an authentication center. This embodiment allows for increased security by authenticating a user using an external authentication center separate from the system. In further embodiments, the authorization of the data access request is granted by the provider of the data. This embodiment allows the provider of the data to control who is granted authorization to access the data.

In accordance with embodiments of the present invention, there is provided a method of storing data in a networked database. The method includes receiving, by an ingress gateway (GW), a data upload request. The method further includes authenticating, by a controller, the data upload request. The method further includes receiving, by the ingress GW, upload data. The method further performs data classification of the upload data, by the ingress GW, encrypting, by the ingress GW, the upload data. The method further includes sending, by the ingress GW, the upload data to a database. This embodiment serves to decouple the data storage service from the access control service. This allows these two services to be provided by different entities and allows the database service provider to have zero-knowledge of the data stored therein. In further embodiments, the upload data is encrypted by the ingress GW using the data classification, a hardware-protected key of the ingress GW, and a first cryptographic key that is computed by the ingress GW based on a second key that is negotiated between the ingress GW and a provider of the upload data. This embodiment serves to ensure secure communication between a provider of the upload data and the system.

In further embodiments, the first cryptographic key is computed based on a classification of the upload data. This embodiment may serve to provide security levels customized to a characteristic of the data. Other embodiments include decrypting, by the ingress GW, the data using the second key before encrypting the data with the first cryptographic key. This embodiment may serve to provide additional security by encrypting the upload data twice before it is sent to the database provider.

In accordance with embodiments of the present invention, there is provided a method of requesting data from a networked database. The method includes receiving, by an egress gateway (GW), a data access request for data stored in a database. The method further includes authenticating, by a controller, the data access request. The method further includes receiving, by the controller, authorization of the data access request, from a provider of the data. The method further includes receiving, by the egress GW, the data from the database and performing data classification on the data. The method further includes receiving, by the egress GW, a cryptographic key from the provider of the data. The method further includes decrypting, by the egress GW, the data using the cryptographic key. The method further includes providing, by the egress GW, the data requested in the data access request. This embodiment serves to decouple the data storage service from the access control service. This allows these two services to be provided by different entities and allows the database service provider to have zero-knowledge of the data stored therein. This embodiment further serves to allow the provider of the upload data to control access to entities requesting access to the upload data.

Further embodiments include decrypting the data, by the egress GW, using a third cryptographic key computed by the egress GW based on the cryptographic key received from the provider of the data and a hardware-protected key of the egress GW, before fulfilling the data access request. This embodiment serves to allow the provider of the upload data to control access to entities requesting access to the upload data. In further embodiments, the third cryptographic key is computed based on the classification of the data. This embodiment may serve to provide security levels customized to a characteristic of the data. In further embodiments the data requests are authenticated by the controller using an authentication center. This embodiment allows for increased security by authenticating a user using an external authentication center separate from the system.

In accordance with embodiments of the present invention, there is provided an apparatus for example implementing as an ingress gateway (GW), including processor, at least one network interface; and non-transitory machine readable memory storing machine readable instructions which when executed by the processor, configures the ingress GW. The ingress GW is configured to receive data upload request from a data provider, the data upload request including data; send the data upload request to a controller; receive a response corresponding to a data request from a controller; perform data classification on the data according to the response to obtain a classification result; generate a cryptographic key, the cryptographic key based on the classification result, a hardware-protected key in the GW, and a key from the data provider; encrypt the data using the cryptographic key; and send the encrypted data to the database for storage. Advantageously in the database and the GW can be operated by different parties to provide enhanced security and privacy. In further embodiments. the data received by the ingress GW is encrypted data from the data provider. In further embodiments. the ingress GW is further configured to decrypt the encrypted data from the data provider based on the key from the data provider to obtain decrypted data, wherein the data encrypted by the ingress GW is the decrypted data. In further embodiments. the ingress GW is configured to send the encrypted data to the database for storage by sending the encrypted data via a data distribution center to the database for storage. In further embodiments. the response is an authentication of the data provider. In further embodiments. the ingress GW and the controller are operated by the same party, which differs from the party operating the database.

In accordance with embodiments of the present invention, there is provided apparatus for example implementing as an egress gateway (GW) including a processor; at least one network interface; and non-transitory machine readable memory storing machine readable instructions which when executed by the processor, configures the egress GW. The GW is configured to: receive a data access request from a data requester; send the data access request to a controller for authentication and authorization; receive a data indication from the controller; perform data classification on the received data indication to obtain a second classification result; receive data from the database associated with the data access request; and generate a decryption key based on the second classification result, a hardware-protected key of the egress GW, and the key from a data provider; and decrypt the data based on the decryption key, and provide the decrypted data to the data requester. In further embodiments. the database and the GW are operated by different parties. In further embodiments. the egress GW is configured to decrypt the data by perform a decryption of the data based on the decryption key and the key from the data provider. In further embodiments. the egress GW and the controller are operated by the same party, which differs from the party operating the database.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIGS. 10A through 10C, illustrates a data access method for accessing data stored with a database provider, according to an embodiment of the present disclosure.

FIG. 11 illustrates data classification based on security levels, according to an embodiment of the present disclosure.

FIG. 12 illustrates data classification based on data characteristics, according to an embodiment of the present disclosure.

FIG. 13C illustrates key generation by an ingress GW when a two-level encryption method is used, according to an embodiment of the present disclosure.

FIG. 13D illustrates key generation by an egress GW when a two-level encryption method is used, according to an embodiment of the present disclosure.

It will be noted that throughout the appended drawings, like features are identified by like reference numerals.

DETAILED DESCRIPTION

Embodiments of the invention provide methods, apparatus, and systems to provide a DBaaS that protects and enhances the privacy of data providers and includes authentication and access controls for accessing data stored in one or more database or other storage. Embodiments provide "privacy database access control" (PDAC) and enable the offering of PDAC as a service (PDACaaS) to data providers, data requestors, database providers, and the DBaaS service providers. Embodiments may support a number of levels of data privacy or security, with selectable or customizable protection levels. Multiple PDAC service architectures, multiple cryptographic (encryption and decryption) schemes and multiple options of data privacy processes are also supported. Embodiments decouple the responsibilities of data storage by database providers from data access controls to avoid having a single provider of both data storage and access controls. This decoupling provides a more secure system that is transparent to data providers and data requestors to enable a more secure and trusted data storage environment.

Figure 1:
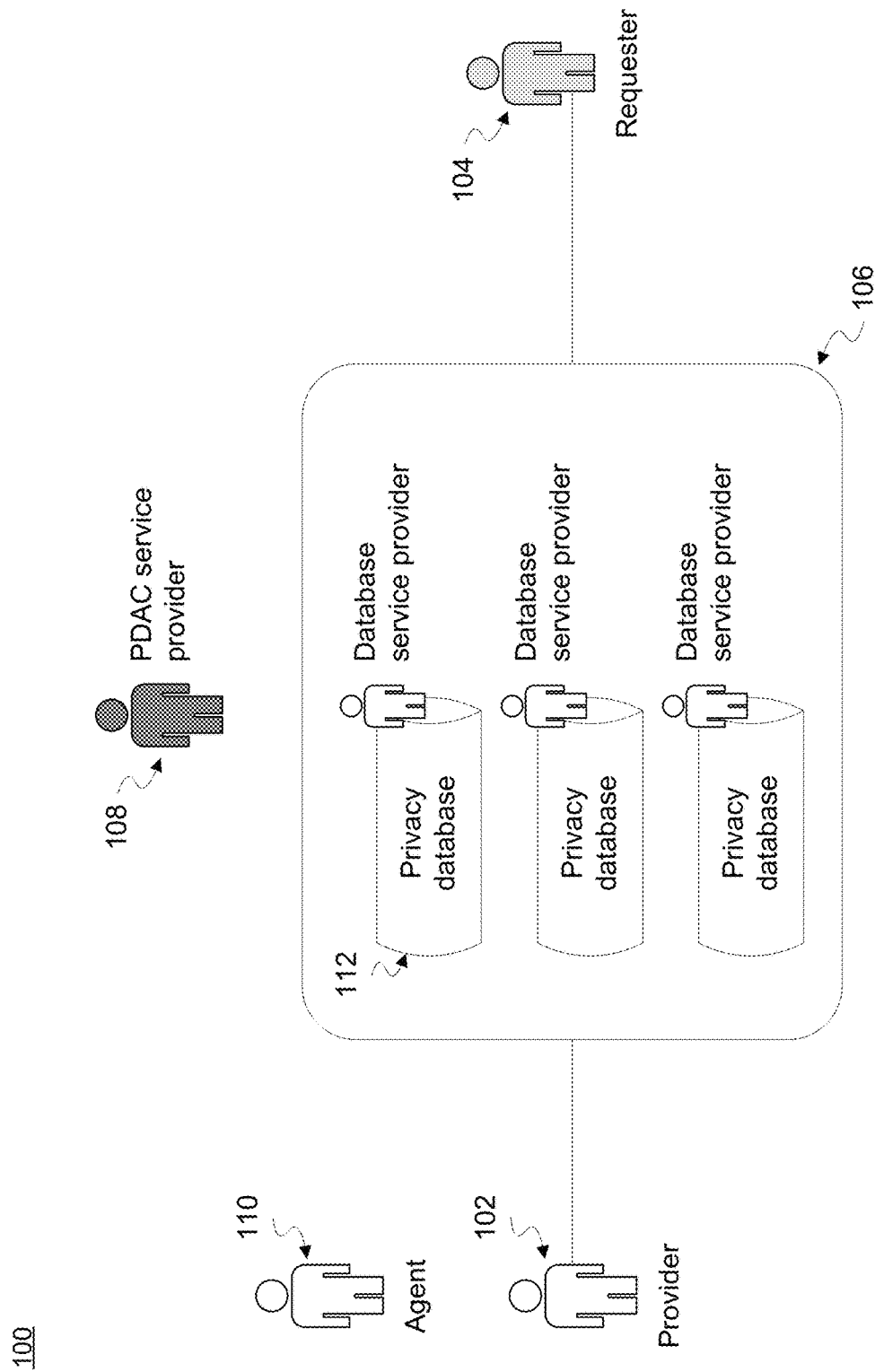
FIG. 1 illustrates the parties or entities involved, and the roles they play in a PDAC system, according to an embodiment of the present disclosure.

FIG. 1 illustrates the parties or entities involved in a PDAC system 100 and the roles they play, according to an embodiment of the present disclosure. PDAC system 100 is managed and controlled by a separate entity known herein as a PDAC service provider 108. A PDAC service provider 108 provides access control to a database service provider 106 and databases 112. In embodiments, a database service provider 106 may provide access to one or more databases 112. In the case where access to only a single database is provided, the terms database service provider and database provider may be used interchangeably. In order to prevent unauthorized access by the database service provider 106 to data stored in databases 112, the PDAC service provider 108 may be an independent entity from the database service provider 106. Therefore, for increased security, a PDAC service provider 108 should not provide database services and a database service provider 106 should not be a PDAC service provider 108.

The data provider 102, or provider for short, is a client of the PDAC service. The data provider 102 may be a person who owns data which is proprietary to themselves or which the data provider 102 has the right to provide and share. A data provider 102 may be the owner of one or more computing devices that create or store private data. In embodiments, the computing device may be a mobile device such as a cellular phone. A data provider 102 may also be an organization that owns data with is private to themselves. A data provider 102 uses the PDACaaS to upload and securely store the proprietary data and utilizes the PDAC service to control and manage access and use of their data by others. Examples of a data provider 102 are a government department storing citizenship information or a medical laboratory storing patients' test results or medical history. An individual may use a PDAC service to keep their financial data, or other personal information. In these examples, there may be a need for the data provider 102 to grant access to some or all of their data to a third party. In other cases, there may exist a legal need for an authorized party to access the data. There may also exist a need for a third party to access a portion of anonymized data, for example to compile health statistics. Embodiments provide mechanisms to inform the data provider 102 should access to their data be requested or demanded.

Data is stored in a number of independent or affiliated privacy databases 112. A database service provider 106 is used in the PDAC system to provide databases 112 to store proprietary data of data providers 102. These data providers 102 should be different from a PDAC service provider 108 to ensure that the data stored within the database 112 cannot be accessed by the database service provider 106. In embodiments, the database provider 106 does not have access to data in unencrypted or decrypted form and is not aware of the contents of the data stored within. The database 112 may use a number of underlying technologies. It may be relatively simple network attached storage, a remote server, or cloud computing storage. It may also be a sophisticated relational database offering a large amount of storage, robust backup facilities, and fast access. Each database 112 may provide database information including parameters to the database service provider 106 or to the PDAC service provider 108 concerning the location, capabilities, and operational parameters of each database 112. This database information may include, but is not limited to, storage capacity of database, supported programming language, the location or address of the database, etc.

Data is obtained from database service provider 106 by one of more data requestors 104. A data requester 104 is a person or an organization that desires to access the proprietary data of the data provider 102. In embodiments, access to the data will be authorized by the data provider 102 or through legal means. Examples of data requestors 104 are authorized government entities, health care providers (such as a doctor or dentist) of the data provider 102, or parties designated by the data provider 102. The data requester 102 can access data either on-line or off-line. On-line access is where a data requester 104 can only remotely access and process data that is stored in PDAC system 100. Off-line access is when a data requester 104 may download data and process the data locally. Other methods of access may also be used as well as a mix between on-line and off-line access.

In embodiments, the data provider 102 may be represented by an agent 110. An agent of data provider 102 can perform required data processing on-behalf of data providers 102 if a mutual level of trust has been established between them or a contract exists for the agent 110 to represent the data provider 102. In general, a data provider can include either the data owner or an agent. In some embodiments only the data owner can provide authorization. In other embodiments, the data provider can provide the authorization, with the data provider being either the data owner or the agent.

Figure 2:
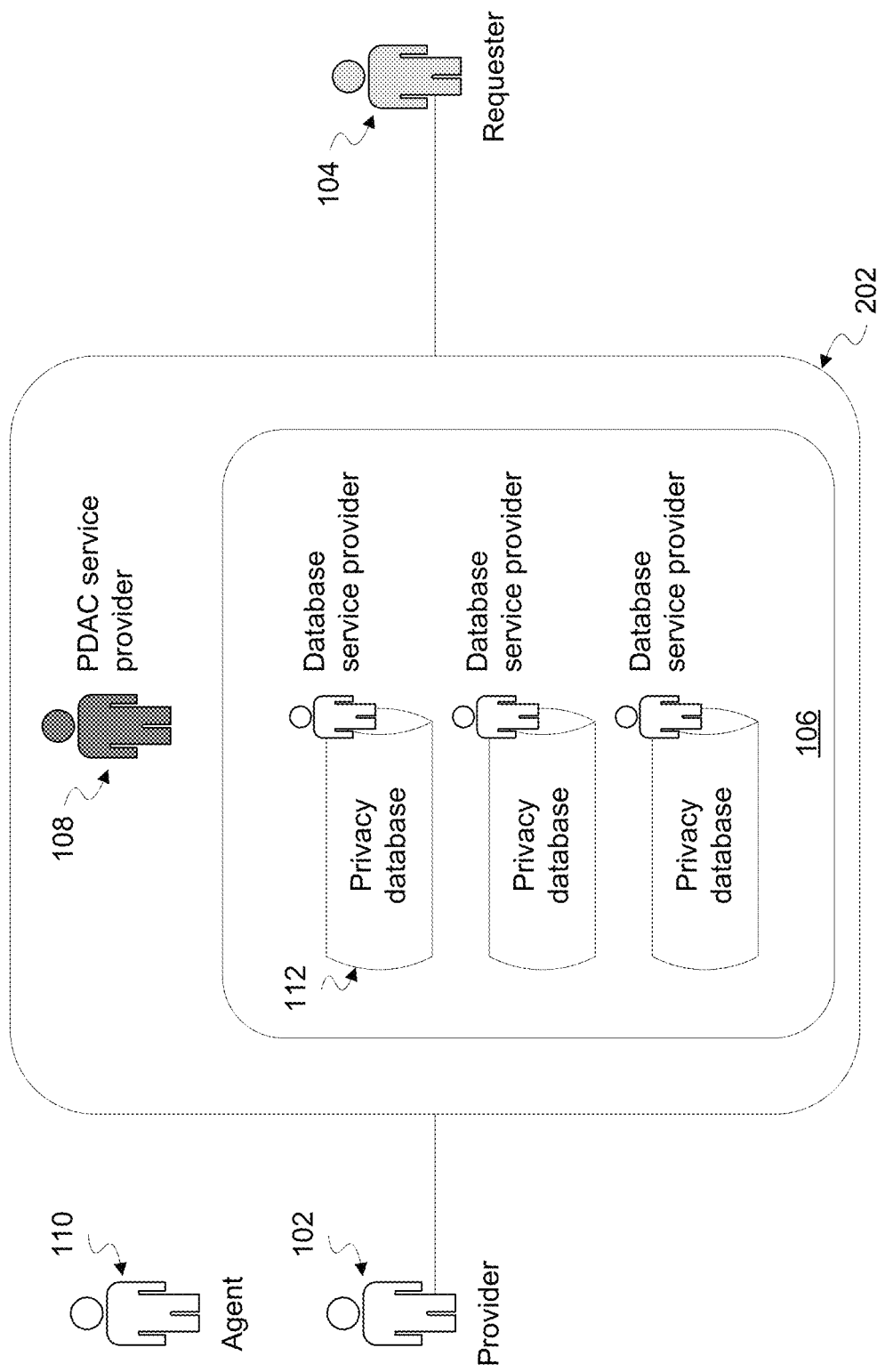
FIG. 2 illustrates a PDACaaS that includes a PDAC service consortium, according to an embodiment of the present disclosure.

As illustrated in FIG. 2 the PDAC service provider 108 may be grouped with the database service provider 106 and its individual databases 112 to form a PDAC service consortium 202 to provide a PDACaaS. In embodiments, a PDAC controller 302 of FIG. 3 may perform authentication and authorization actions with a third-party authentication, authorization, and accounting (AAA) entity such as authentication center 602 of FIG. 6. The authentication center 602 may be part of a cellular wireless network's core network (CN).

PDAC service architectures may utilize a number of variations including one-layer architectures, two-layer hierarchical architectures, and PDAC service confederation architectures as described below.

Figure 3:
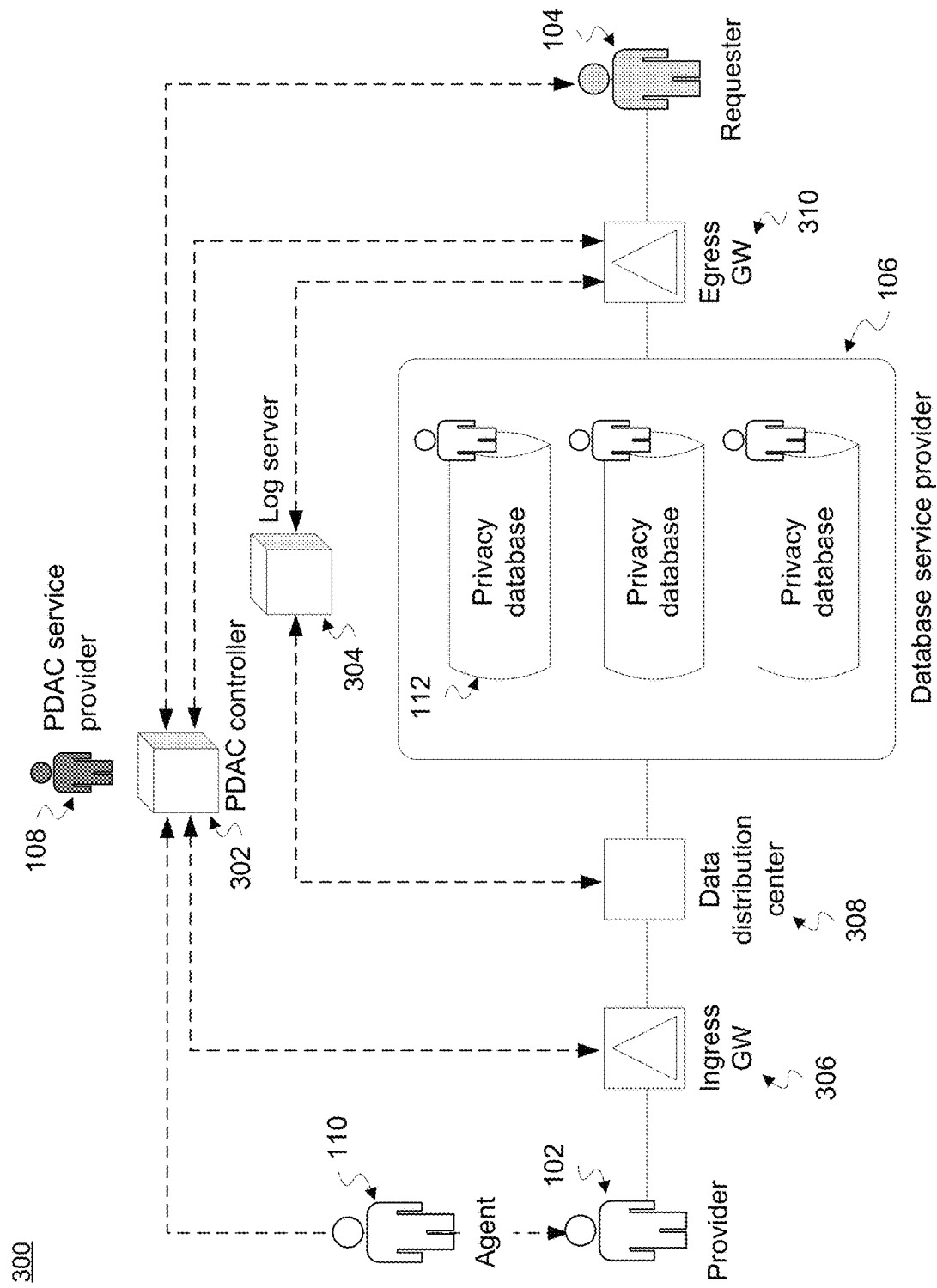
FIG. 3 illustrates a PDAC system with a one-layer architecture, according to an embodiment of the present disclosure.

FIG. 3 illustrates a one-layer architecture according to an embodiment. In this embodiment, a PDAC controller 302, ingress gateway (GW) 306, and egress gateway (GW) 310 have been added to the architecture of FIG. 2. The ingress GW 306 and egress GW 310 may be under the control of the PDAC service provider 108 but in other cases the ingress GW and egress GW may be controlled by different entities. In addition, this architecture may provide a data distribution center 308 and log server 304. Data distribution center 308 may be controlled by different providers such as the PDAC service provider 108, database service provider 106, or a third party. The log server 304 may be controlled by the PDAC service provider 108 or the database service provider 106. The log server 304 is in communication with the data distribution center 308 and the egress GW 310.

The ingress GW 306 connects to data providers 102 (or their agents 110) for receiving upload data provided by the data provider 102. The ingress GW 306 may also serve to hide the identity of the data provider 102 or their agent 110 from the database provider 106, providing anonymity to the data provider 102 and enabling the uploading of data anonymously. The ingress GW 306 may also provide increased network performance between the data provider 102 and the database 112 by using techniques such as proxies and buffering as is known in the art. An ingress GW 306 may be dedicated to a single data provider 102 or group of data providers, or may serve a specific geographic area. An ingress GW 306 also connects to optional data distribution center 308 which in turn connects to one or more databases 112 provided by database service provider 106 for data storage. An ingress GW 306 includes both control function and data process functions.

The egress GW 310 connects databases 112 to data requester 104 for the forwarding of data to requester 104. The egress GW 310 may also serve to hide the identity of the data requester 106 from the database provider 106. The egress GW 310 may also provide increased network performance between the data provider 102 and the database 112 by using techniques such as proxies and buffering as is known in the art. An egress GW 310 may be dedicated to a single data provider 102 or group of data providers or may serve a specific geographic area. The egress GW 310 also connects to the log server 304 to provide more efficient data access. An egress GW 310 includes both control function and data process functions. Egress GW 310 can be extended to include sufficient computing resource to enable on-line data processing by a data requester 104 where data is not transferred to the data requester 104.

Control interfaces between elements of the PDAC system are indicated by the dashed line in FIG. 3. The PDAC service provider 108 operates the PDAC controller 302. The PDAC controller 302 may have control interfaces to the data provider 102 or their agent 110, the ingress GW 306, the egress GW 310, and the data requester 104. The log server 304 may have control interfaces to the data distribution center and the egress GW 310. Other control interfaces not illustrated may also exist as required.

The PDAC service elements may be implemented in a number of ways including as discrete computing systems or as elements of a network slice, which includes the elements as illustrated in FIG. 3 and interconnections among them. Network slicing refers to a technique for creating virtual networks which separate different types of network traffic, and which can be used in reconfigurable network architectures such as networks employing network function virtualization (NFV). A network slice is composed of a collection of logical network functions that supports communication service requirements of particular use cases. Logical network functions may be instantiated on network hardware including servers, routers, etc. A network slice also includes the necessary links between network functions with allocated bandwidth to meet quality of service (QoS) and quality of experience (QoE) requirements.

In embodiments, portions of the PDACaaS architecture may be implemented as virtual network functions. In some cases where network access is provided through cellular wireless networks, entities such as ingress GW 306 and egress GW 310, that communicate with data provider 102 and data requester 106, may be implemented in a radio access network (RAN) portion of the network. This may be beneficial where the data provider 102 or data requester 106 is a cellular mobile device or user equipment (UE).

Figure 4:
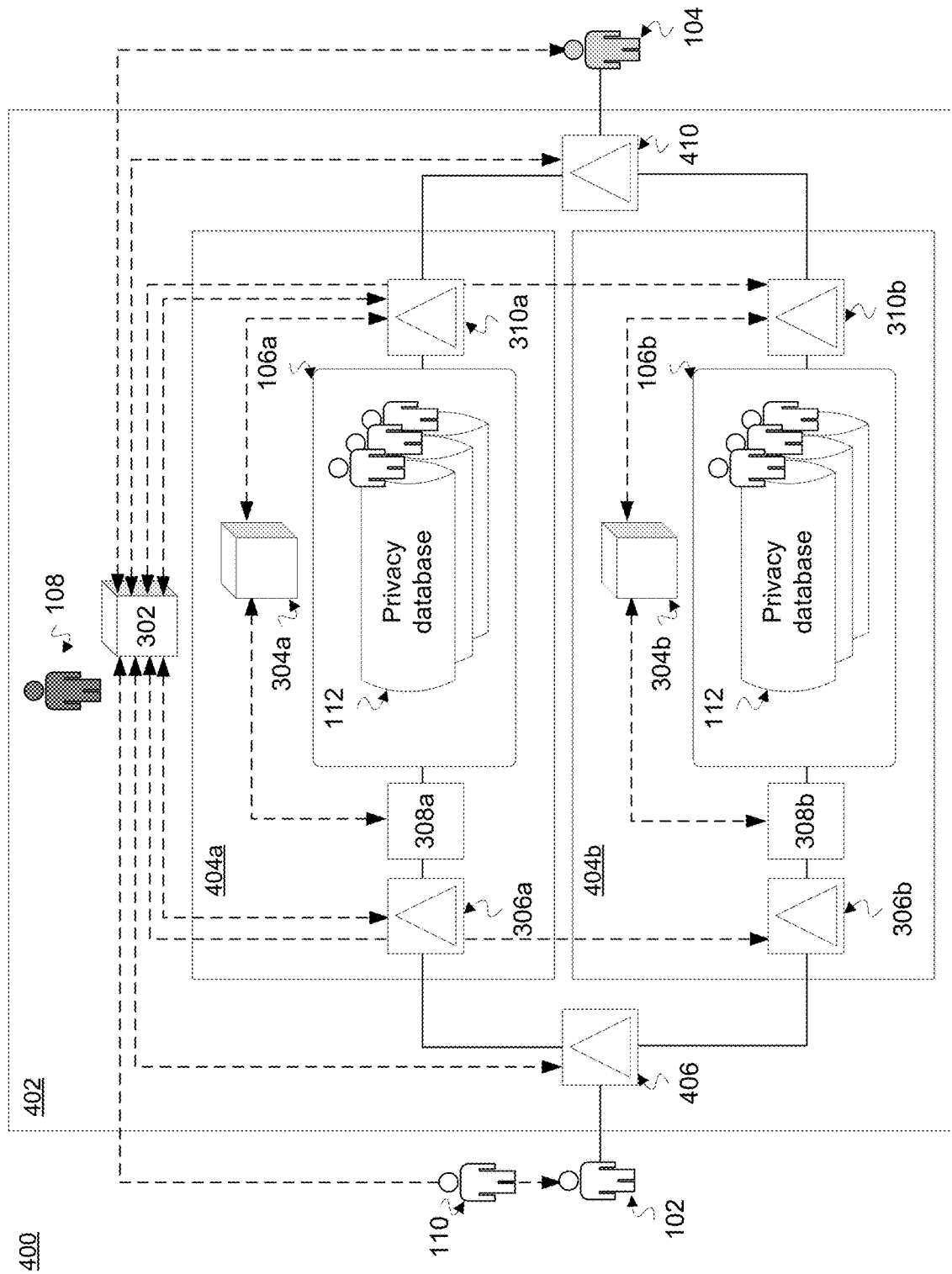
FIG. 4 illustrates a hierarchical PDACaaS architecture, according to an embodiment of the present disclosure.

FIG. 4 illustrates a hierarchical PDACaaS architecture according to an embodiment of the present disclosure. The hierarchical PDACaaS architecture may comprise a multi-layered PDAC service consortium, for example the two-layered PDAC service consortium 400 illustrated in FIG. 4, including first layer consortiums 404*a* and 404*b*, and the second layer consortium 402. Each first layer consortium 404*a* and 404*b*, includes multiple database providers 106*a* and 106*b*, each with their own ingress GW 306*a* 306*b*, data distribution center 308*a* 308*b*, egress GW 310*a* 310*b*, and log server 304*a* 304*b* respectively. The second layer consortium 402 includes an ingress GW 406 and egress GW 410 provided so that the two-layer PDAC service consortium 400 appears to a data provider 102 or a data requestor 104 as a one-layer architecture 202 as illustrated in FIG. 3. It can be appreciated that the number of databases 112 and the number of database providers 106*a* and 106*b*, in each first layer consortium, may be increased to an arbitrary number and the levels of hierarchy of the ingress GW 406, 306*a*, and 306*b*, as well as the levels of hierarchy of the egress GW 410, 310*a*, and 310*b* may be increased to account for factors related to performance such as load balancing, latency, geographic location, redundancy, etc.

Figure 5:
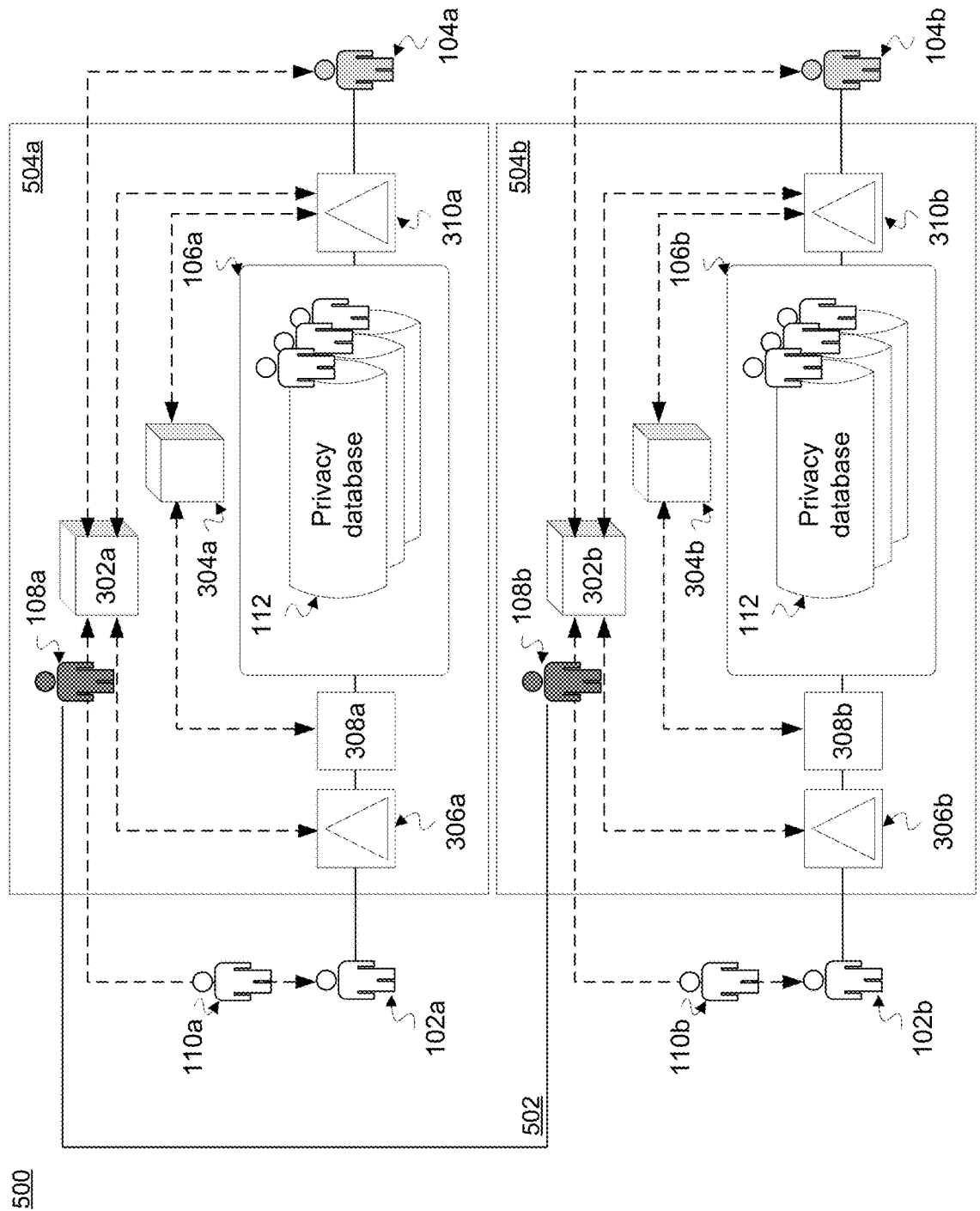
FIG. 5 illustrates a PDACaaS confederation architecture, according to an embodiment of the present disclosure.

FIG. 5 illustrates a PDACaaS confederation architecture according to an embodiment of the present disclosure. The PDACaaS confederation architecture 500 may comprise one or more service consortium 504*a* and 504*b* as illustrated. Each service consortium may comprise at least one PDACaaS providers, for example 108*a* and 108*b*. The PDACaas providers within the architecture 500 may form a confederation which may be referred to as a "PDAC confederation" or a "PDAC service confederation". The PDAC confederation includes interface 502 that enables communication and cooperation among multiple PDACaaS providers 108*a* and 108*b* for more efficiently performing various actions, such as, data requests, approval requests, record sharing, etc. Accordingly, the PDACaaS providers 108*a* and 108*b* may communicate and cooperative together to respond to requests, by data providers 102*a* or 102*b*, for uploading data requests from data requester 104*a* 104*b* for access to uploaded data, etc. In some embodiments, the PDAC confederation may also comprise one or more of the data providers 102*a* and 102*b*, their agents 110*a* or 110*b* respectively, and data requestors 104*a* or 104*b* as members of a PDAC service confederation. It can be appreciated that the number of PDAC service consortiums 504*a* and 504*b* may be increased to an arbitrary number to account for factors related to performance such as load balancing, latency, geographic location, redundancy, etc. As well, a PDAC service confederation of large organizations may also be implemented where each of the participating organizations has its own PDAC service provider. It can also be appreciated that the multi-layer architecture 400 may be combined with a confederation architecture 500 to produce more complex PDACaaS architectures as required or desired for specific implementations.

The different PDACaaS architectures may be used to enable different levels of security. Multi-layer architecture 400 provides a higher level of reliability and performance over the single layer architecture 300 due to redundancy of database service providers 404a and 404b, and ingress and egress GWs. Confederation architecture 500 enables more secure operations since different PDAC service providers 108a and 108b may provide customer security and service to different types of data providers 102a and 102b, and to different types of service requesters 104a and 104b.

PDAC service providers 108 provide a number of services and perform a number of actions to provide PDACaaS. The PDAC service provider 108 is responsible for deploying PDAC controller 302. Deploying PDAC controller 302 may include instantiating a network slice, a virtual machine, activating or enabling the controller, as well as deploying a required number of PDAC controllers as is appropriate for the selected PDACaaS architecture.

In turn, the PDAC controller 302 is responsible for registering and authenticating data providers 102 and controlling data uploading by the data provider 102 or their agent 110. The PDAC controller 302 is also responsible for registering and authenticating data requestors 104 and controlling access to the data by a data requester 104.

The PDAC controller 302 is responsible for deploying or instantiating any ingress GW 306 or egress GW 310 as required by the PDACaaS architecture. Ingress GW 306 are deployed to provide sufficient interfaces to data providers 102 or their agents 110, and to data distribution centers 308. Ingress GW 306 controls data uploads, including data classification and control of keys for encryption of the data.

As used herein, cryptographic keys may be referred to simply as keys, and include both encryption keys and decryption keys. Encryption keys refer to cryptographic keys used to encrypt data. Decryption keys refer to cryptographic keys used to decrypt data. An encryption key and decryption key may be part of a pair of cryptographic keys such as a public/private key pair or a symmetric keys as is known in the art.

The PDAC controller 302 is responsible for deploying or instantiating any data distribution centers 308 to control the data distribution among databases 112.

The PDAC controller 302 is responsible for deploying or instantiating any egress GW 310 to control access to data stored in databases 112 including data classification, controlling of encryption and decryption, online and offline access to the data, and interfacing with data requesters 104, and log server 304. The egress GW 310 may also be extended to interface with cloud computing resources used when data requester 104 is only enabled for online access to the data.

Each of the database service providers 106 may determine or specify whether to deploy, instantiate, and manage any log servers 304 required by their databases 112. Database service providers 106 also provide and manage databases 112 to store data and deploy database controllers to interface with the ingress GW 306, egress GW 310, or any controller of the ingress GW 306 or egress GW 310.

Figure 6:
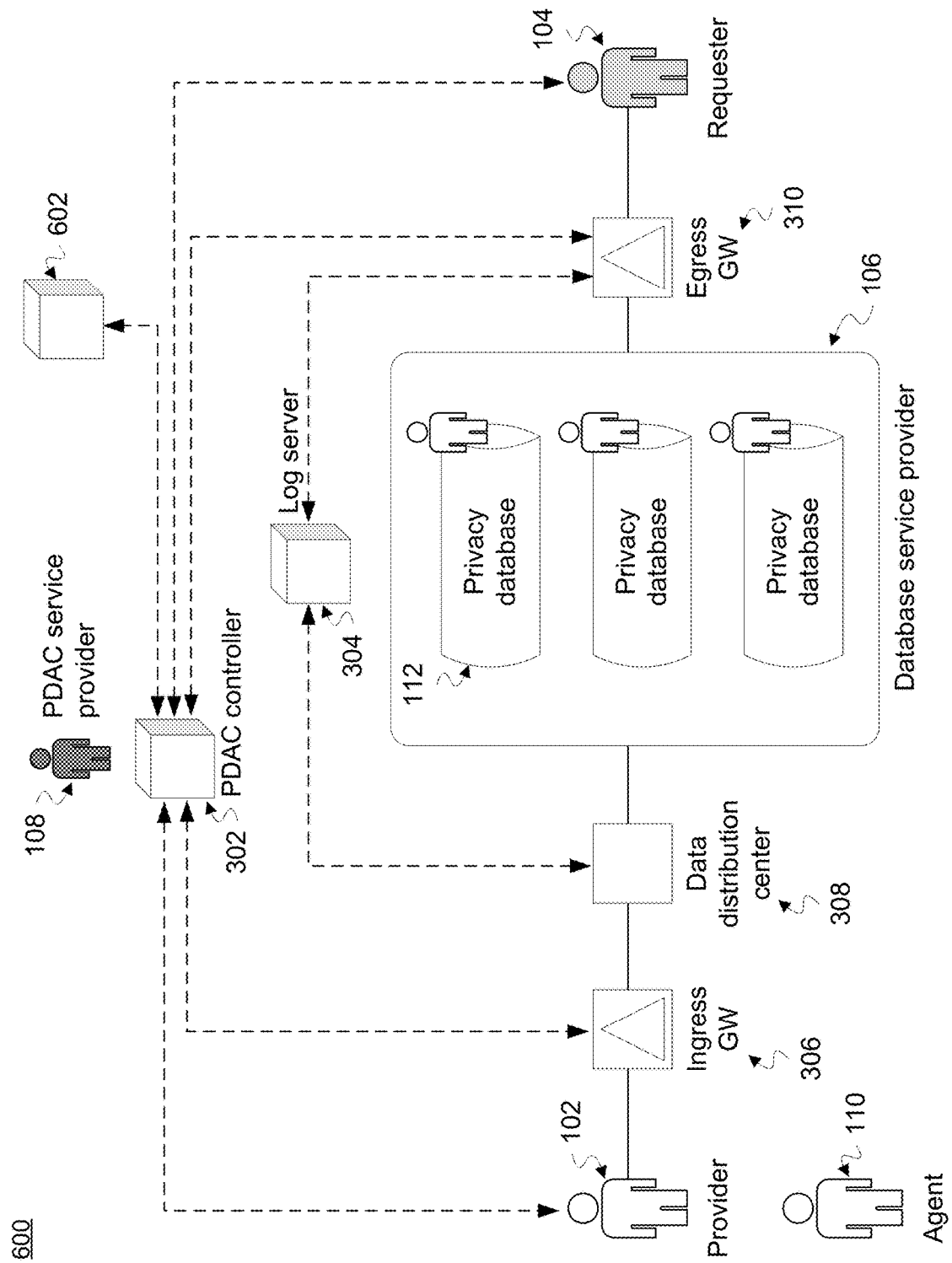
FIG. 6 illustrates a PDAC system that further includes an authentication center, according to an embodiment of the present disclosure.

FIG. 6 illustrates a PDAC system that further includes an authentication center, according to an embodiment of the present disclosure. The PDAC system 600 of FIG. 6 may be similar to the PDAC system 300 of FIG. 3 with the addition of the authentication centre 602. As discussed herein, in some embodiments, the PDAC controller 302 may perform authentication and authorization actions with a third-party AAA entity such as authentication center 602 as further discussed herein.

Figure 7:
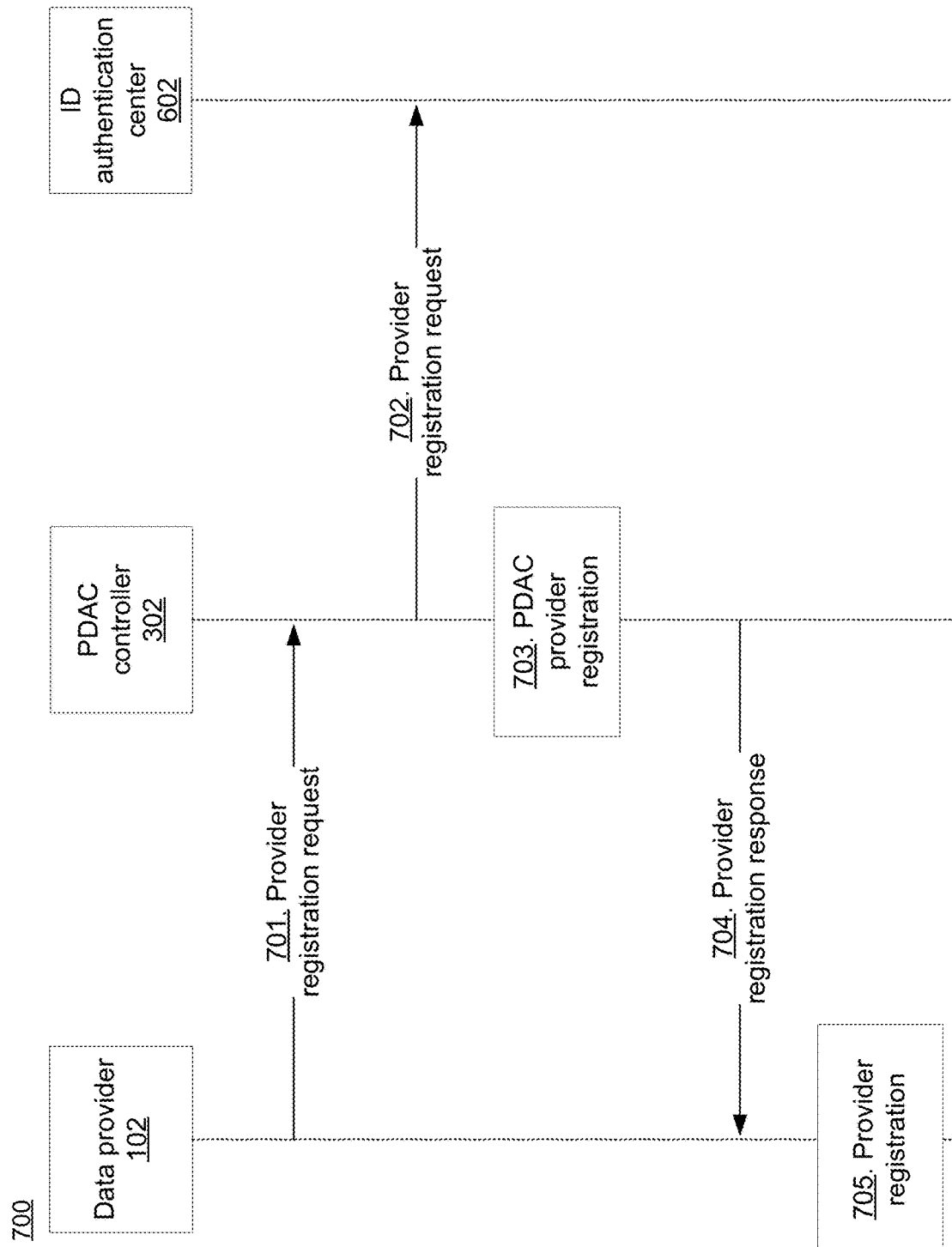
FIG. 7 illustrates a method of registering a data provider with a PDAC service provider, according to an embodiment of the present disclosure.

In embodiments, a data provider 102 or a data requester 104 must be registered with the PDAC service provider 108 in order to utilize the PDACaaS. FIG. 7 illustrates a method of registering a data provider 102 with a PDAC service provider 108 according to an embodiment of the present disclosure. In step 701, the data provider 102 sends a provider registration request to the PDAC controller 302. Registration request 701 may include one or more parameters, such as a data provider client ID, and contact information, such as a certificate or address, used to authenticate with an authentication center 602 (as illustrated in FIG. 6). In step 702, the PDAC controller 302 may utilizes the contact information to forward the provider registration request to the ID authentication center 602. In some embodiments, the PDAC controller 302 may utilize an ID authentication center 602 that is already known to the PDAC system or determine the ID authentication center 602 by other means. In step 703, if the data provider 102 is successfully authenticated by the ID authentication center 602, the PDAC controller 302 may register the data provider 102 and may assign or generate encryption keys, such as public/private keys, for communications with the data provider 102, with the PDAC controller 102 retaining the private key and client ID. The PDAC controller 302 may also generate authentication parameters such as a PDAC certificate, or an indication that the data provider is now authorized to receive the PDAC services. In step 704, the PDAC controller 302 sends a provider registration response to the data provider 102. The provider registration response may include one or more parameters such as the public key generated for communications between the PDAC controller 302 and the data provider 102, a list of ingress GWs 306 together with public keys and authentication parameters required to communicate with the ingress GWs 306. In some embodiment, encryption keys for use by the data provider 102 may be delivered over a secure channel. In step 705, the data provider 102 receives the provider registration response and stores the public key for encrypting communications with the PDAC controller 302, public keys for communicating with ingress GWs 306, authentication parameters, and its own public/private key pair. The PDAC controller 302 updates its list of registered data providers. In embodiments where an agent 110 acts on behalf of the data provider 102, the agent 110 may perform the actions of the data provider 102 as listed above.

Figure 8:
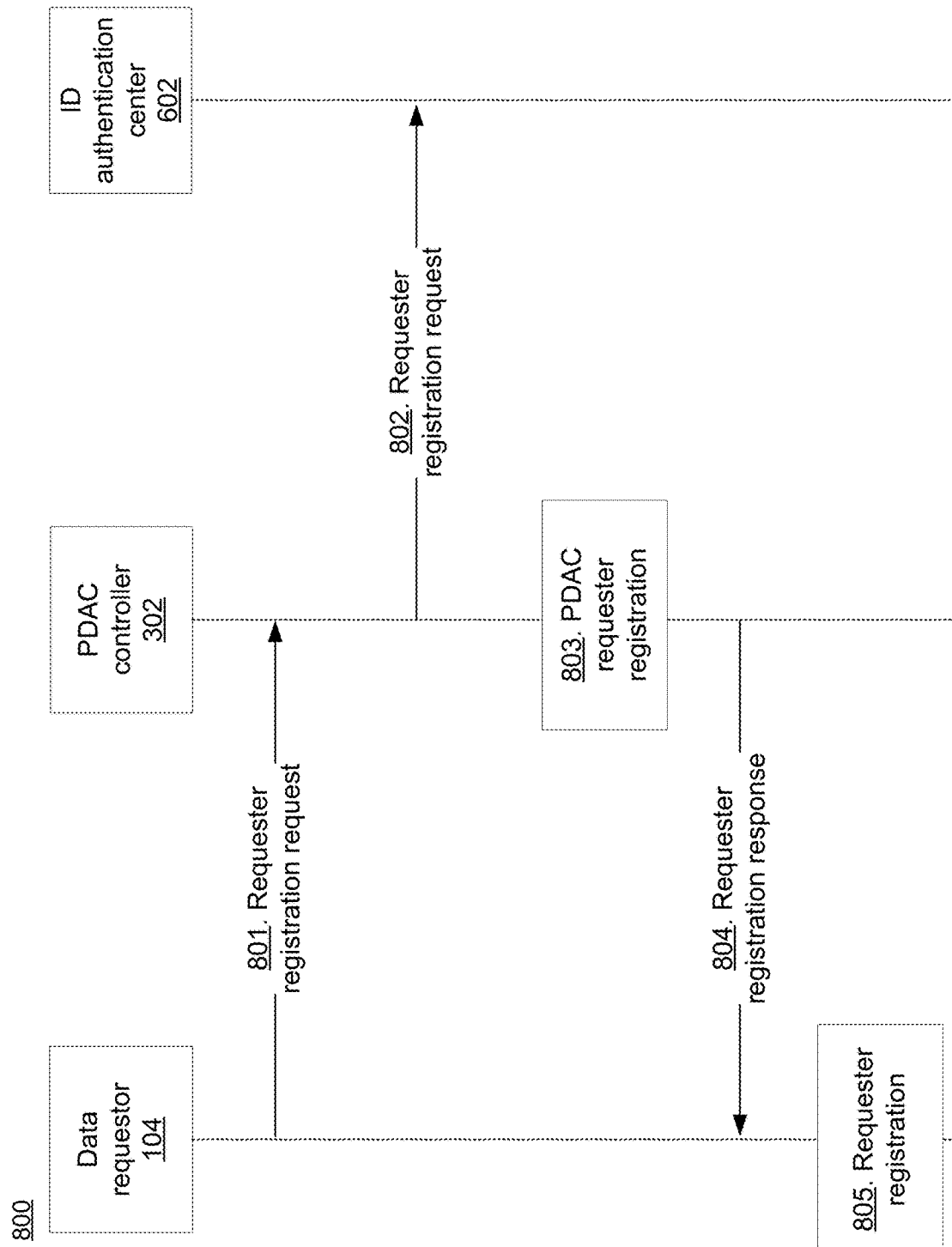
FIG. 8 illustrates a method of registering a data requestor with a PDAC service provider, according to an embodiment of the present disclosure.

FIG. 8 illustrates a method of registering a data requestor 104 with a PDAC service provider 108 according to an embodiment of the present disclosure. In step 801, the data requestor 104 sends a requestor registration request to the PDAC controller 302. The registration request may include one or more parameters, such as a data requestor client ID, and contact information, such as a certificate or address, used to contact the authentication center 602. In step 802, the PDAC controller 302 may utilize the contact information to forward the requestor registration request to the ID authentication center 602. In some embodiments, the PDAC controller 302 may utilize an ID authentication center 602 that is already known to the PDAC system or determine the ID authentication center 602 by other means. In step 803, if the data requestor 104 is successfully authenticated by the ID authentication center 602, the PDAC controller 302 may register the data requestor 104 and may assign or generate encryption keys, such as public/private keys, for communications with the data requestor 104, with the PDAC controller 102 retaining the private key and client ID. The PDAC controller 302 may also generate authentication parameters such as a PDAC certificate, or an indication that the data requestor is now authorized to receive the PDAC services. In step 804, the PDAC controller 302 sends a requestor registration response to the data requestor 104. The requestor registration response may include one or more parameters such as the public key generated for communications between the PDAC controller 302 and the data requestor 104, a list of egress GWs 310 together with public keys and authentication parameters required to communicate with the egress GWs 310. In some embodiment, encryption keys for use by the data requestor 104 may be delivered over a secure channel. In step 805, the data requestor 104 receives the requester registration response and stores the public key for encrypting communications with the PDAC controller 302, public keys for communicating with egress GWs 310, authentication parameters, and its own public/private key pair. The PDAC controller 302 updates its list of registered data requesters.

FIG. 9, including FIGS. 9A through 9D, illustrates a data upload method 900 for uploading data to databases 112 according to an embodiment. The data upload method 900 may provide for one-layer encryption of data by the data provider 102 and ingress GW 306 as well as two-layer encryption of data by the data provider 102 and ingress GW 306. Prior to the execution of the data upload method 900, the data provider 102 has registered with the PDAC service and obtained encryption keys for itself and a list of ingress GWs 306 together with public keys for the ingress GWs 306. The ingress GWs 306 have been pre-configured with required encryption keys as well. These encryption keys may be hardware-protected and may not be changed. In step 901, data provider 102 sends an upload request to ingress GW 306. The data upload request may include parameters, such as a client ID of the data provider 102, authentication material, PDAC service preferences to allow the PDAC system to classify the data and assign a level of security protection to be used with the uploaded data. In step 802, the ingress GW 306 sends the received upload request to the PDAC controller 302 together with the parameters received in the received upload request. In step 903, the PDAC controller 302 verifies the identity of the data uploader 102 and generates an authentication identifier. In step 904, the PDAC controller 302 sends an upload response to ingress GW 306. The upload response may include one or more parameters, such as the client ID of the data provider 102, the authentication identifier generated in step 903, or configuration information of the PDAC service, such as a list of security protection levels supported by the PDAC system. In step 905, ingress GW 306 performs authentication using the authentication material in the upload request and the authentication identifier generated by the PDAC controller 302 in step 903. If authentication is successful, the ingress GW 306 configures the PDAC services for the data provider 102.

Figure 9A:
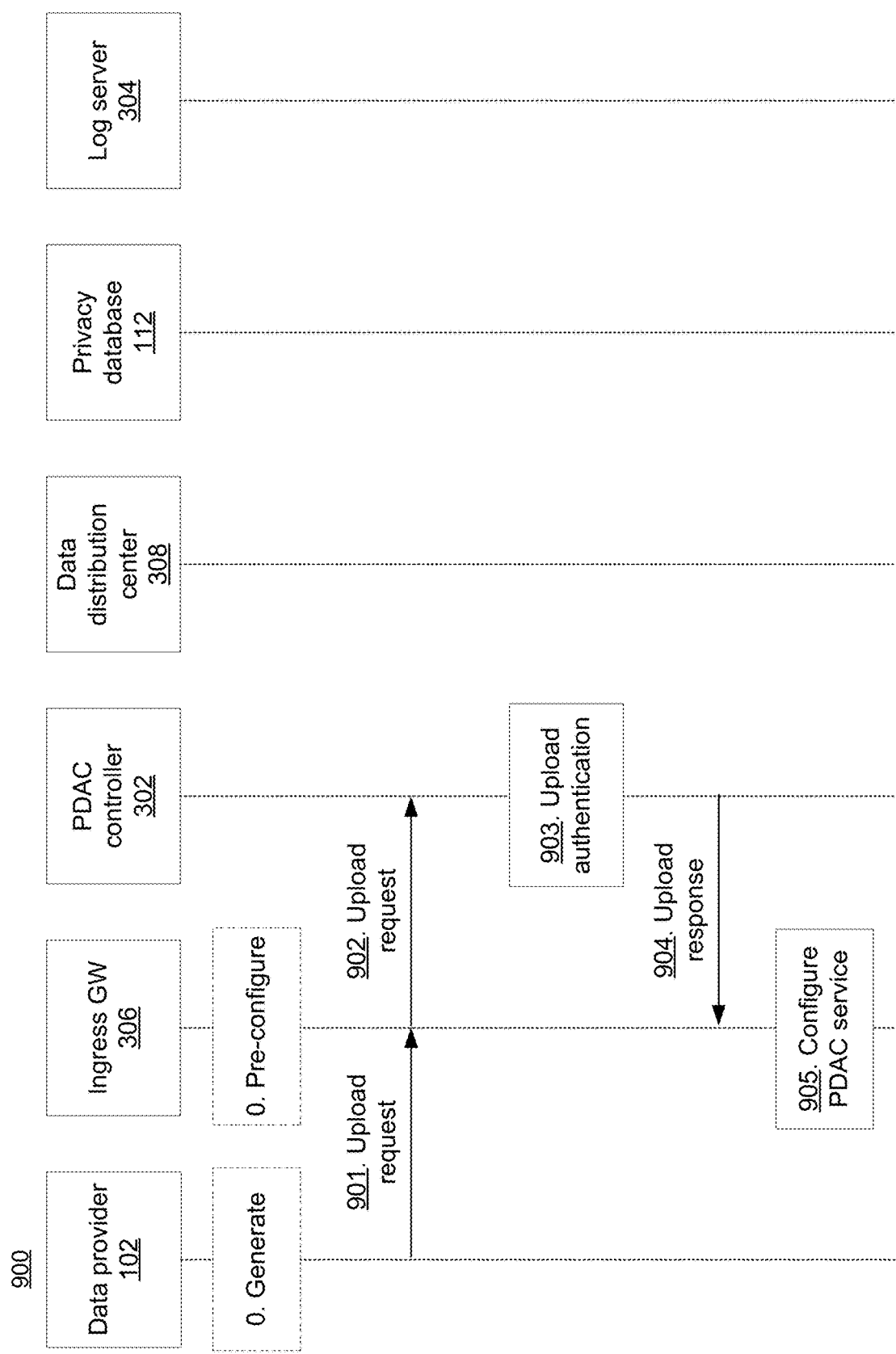
FIGS. 9A through 9D illustrate a data upload method for uploading data to databases in a PDAC system, according to an embodiment of the present disclosure.
Figure 9B:
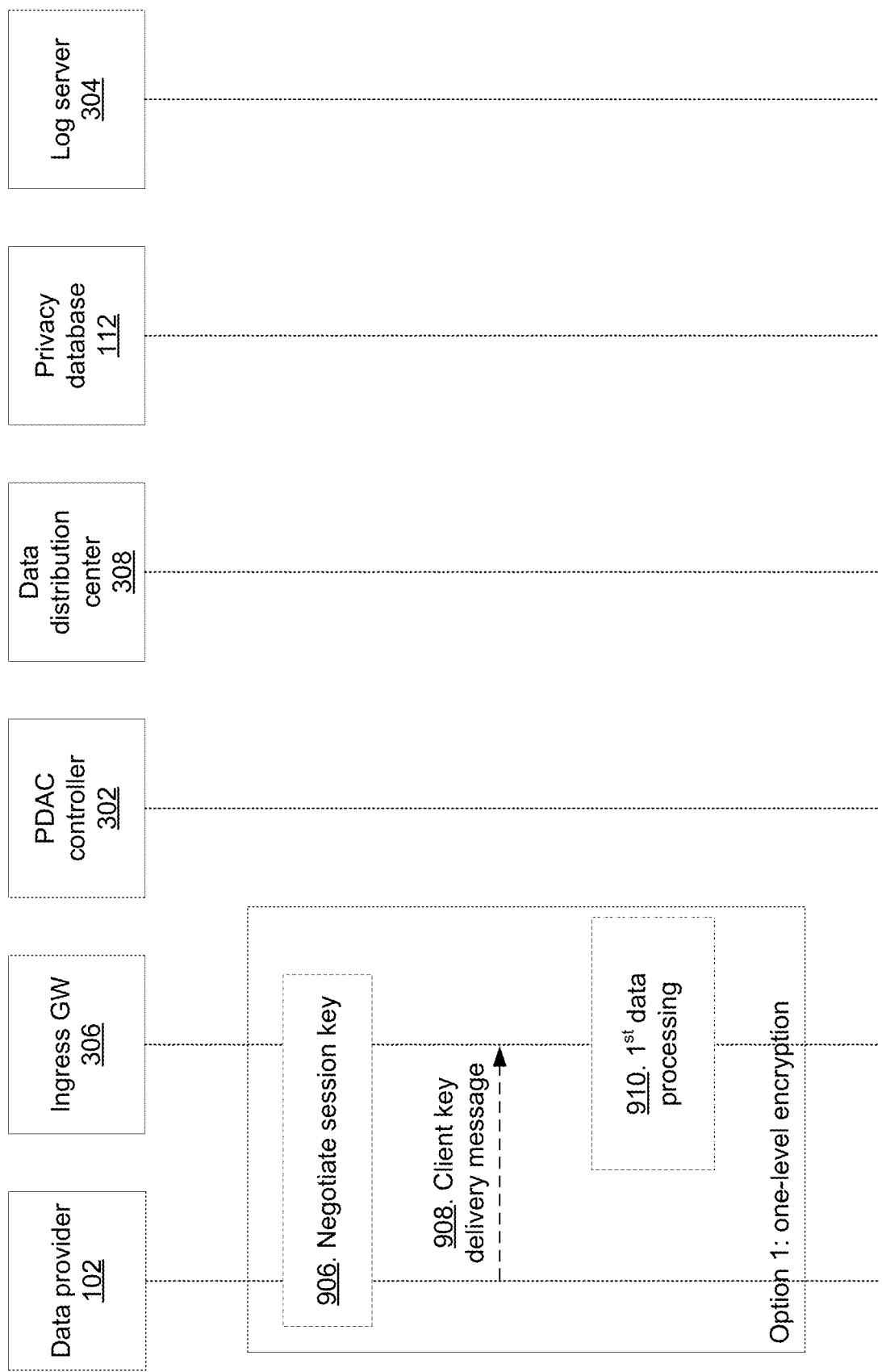

FIG. 9B illustrates a first option that utilizes one-level encryption according to an embodiment of the present disclosure. In step 906, a session key and token ($SK_{tk}$) is negotiated between the data provider 102 and ingress GW 306 using existing methods such as a Diffie-Hellman (D-H) key exchange. The token generated in step 906 is only valid for the duration of the session for which it is generated. In step 908, the data provider 102 sends a client key delivery message to the ingress GW 306. The client key delivery message may include the data provider's 102 key ($K_{client}$) which is encrypted using the session keys generated in step 906. The client key delivery message may also include the data to be uploaded to the ingress GW 306 that may be encrypted using $SK_{tk}$ or $K_{client}$. In step 910, the ingress GW 306 processes the uploaded data from data provider 102 by classifying the data, computing an encryption key (which can be referred to as a cryptographic key), $K_{ingress}$, and encrypting the uploaded data using $K_{ingress}$. Finally, the ingress GW 306 may destroy $K_{client}$ to prevent data that has been encrypted using $K_{client}$ from being accessed.

Figure 9C:
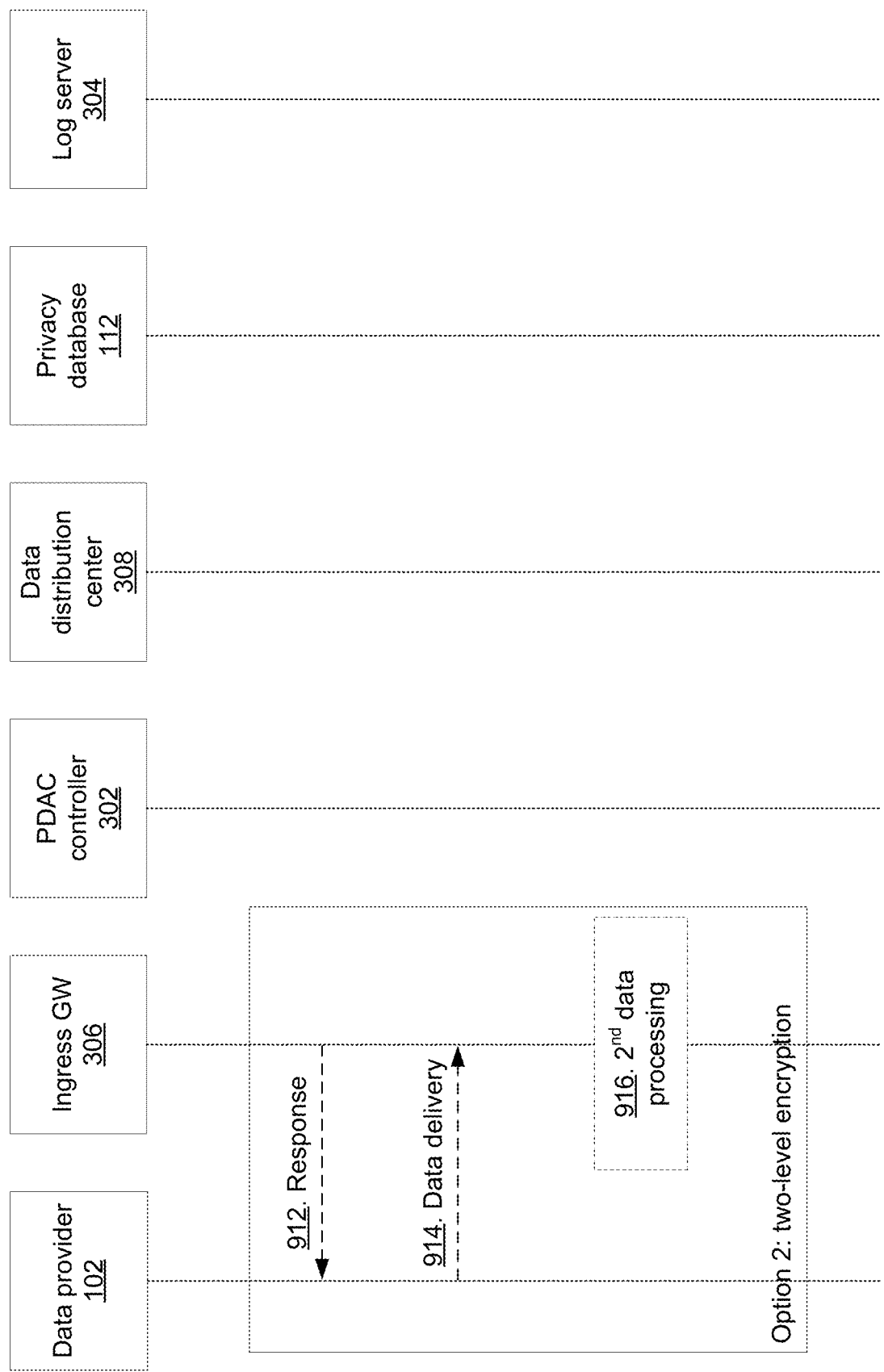

FIG. 9C illustrates a second option that utilizes two-level encryption instead of the one-level encryption of steps 906, 908, and 910 as shown in FIG. 9B, according to an embodiment of the present disclosure. Using the second option, in step 912, after step 910, the ingress GW 306 sends a response to the data provider 102. The response may act as an acknowledgement and contain the results of the authentication. This response may indicate the results of the authentication of step 905 in FIG. 9A. In step 914, the data provider 102 sends upload data together with its data characteristic, classification, or a description to ingress GW 306. The upload data is encrypted using the client's key, $K_{client}$. In step 916, the ingress GW 306 classifies the uploaded data, computes encryption key, $K_{ingress}$, and re-encrypts the data using $K_{ingress}$. Therefore, the uploaded data has been encrypted twice; first by the data provider 102 using $K_{client}$, then by the ingress GW 306 using $K_{ingress}$.

Figure 9D:
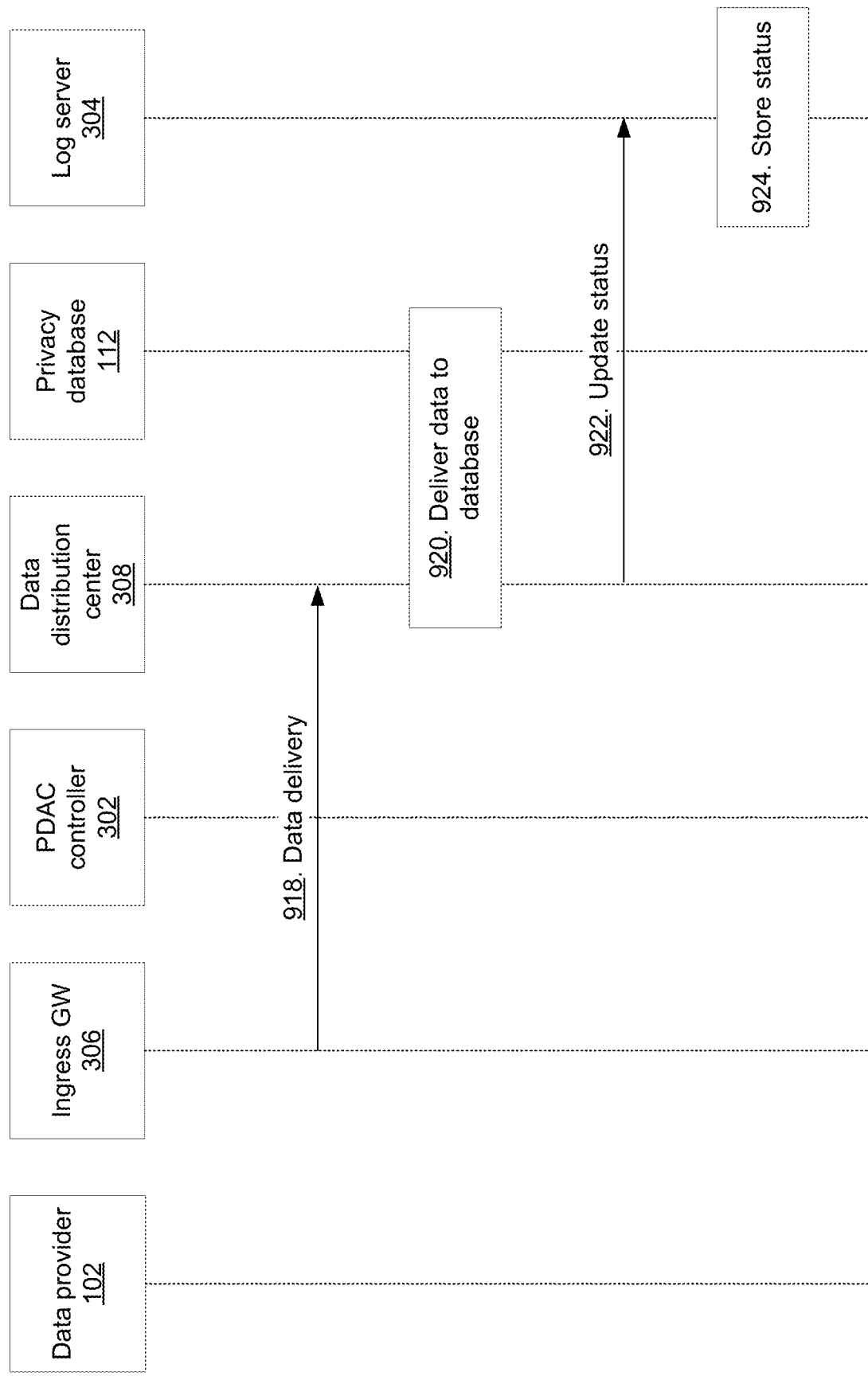

FIG. 9D illustrates the steps that are performed after encryption by the ingress GW 306. In step 918, the ingress GW 306 sends the data encrypted using option 1 (FIG. 9B) or option 2 (FIG. 9C), together with data classification information to data distribution center 308. In step 920, the data distribution center 308 delivers the encrypted data to the privacy database 112. In step 922, the data distribution center 308 sends a status update message to log server 924. The status update message may include one or more parameters, such as the data provider 102 client ID, the database address, and data classification information. Finally, in step 924, the log server 304 stores the update status message therein.

FIG. 10, including FIGS. 10A through 10C, illustrates a data access method 1000 for accessing data stored with the database provider 106 according to an embodiment. The data access method 1000 provides options for both on-line data access and off-line data access. Starting with FIG. 10A, in step 1001, the previously registered data requester 104 sends a data access request to the PDAC controller 302. The data access request may include one or more parameters such as a data requester 104 ID, a known data provider 102 ID, data characteristics or data descriptions, a description of the use of any accessed data, and whether the data requester 104 would like to use an online or offline data access process. In step 1002, the PDAC controller 302 verifies the data requester 104 and determines the egress GW 310 that may be accessed by the data requester 104. In step 1003, the PDAC controller 302 sends a data access approval request to the data provider 102, or their agent 110, that uploaded or owns the data referred to in the data access request received in step 1001. The data access approval request may include one or more parameters, such as a client ID of data provider 102, ID of data requester 104, use of any accessed data, data characteristics or data descriptions, egress GW's IDs or addresses of egress GWs 310 to be used, etc. The data access approval request may also include the public keys of the egress GWs 310. Should the data provider 102 approve the data access approval request, in step 1004, the data provider 102 generates a session key and token, $SK_{tk}$. In step 1005, the data provider 102 sends a data access approval response to the PDAC controller 302. The data access approval response may include one or more parameters such as, $SK_{tk}$ encrypted using the egress GW's 310 public key. $SK_{tk}$ may also be used to encrypt $K_{client}$. In step 1006, the PDAC controller 302 sends a data access response to the data requester 104. The data access response may include one or more parameters such as an ID of the data provider 102, and an ID or address of the egress GW 310 with its public key. In step 1007, the PDAC controller 310 then sends a data access indication message to the egress GW 310. The data access indication message may include one or more parameters such as an ID of the data requester 104 with its public key, the $SK_{tk}$ encrypted using the egress GWs 310 public key, data characteristics or data descriptions, an ID of the data provider 102, and any data processing preferences.

FIG. 10B is the continuation of the data access method 1000, according to an embodiment of the present disclosure. In step 1008, the egress GW 310 assigns data classifications to the requested data using data characteristics derived from the uploaded data. In step 1009, the egress GW 310 sends a database address request to the log server 304. The database address request 1009 may include one or more parameters such as an ID of the data provider 102 or a data classification value. In step 1010, the log server 304 responds to database address request by sending a data address response to the egress GW 310. The data address response may include one or more parameters such as an ID of the data provider 102, or an address, location of the database, or an address of the data stored in the database. In step 1011, the egress GW 310 fetches the data from the database or databases where they are stored. In step 1012, the egress GW 310 sends a client key request to the data provider 102. The client key request may include one or more parameters such as the data provider's 102 encryption key (which can also be referred to as the second key), $K_{client}$, encrypted using the session key, $SK_{tk}$. In step 1013, the data provider 102 responds to the client key request with a client key delivery message sent by the data provider 102 to the egress GW 310.

FIG. 10C is the continuation of the data access method 1000, according to an embodiment of the present disclosure. In step 1014, the egress GW 310 processes the requested data by computing encryption keys (which may be referred to as cryptographic keys), $K_{egress}$, used to decrypt the requested data, destroys $K_{client}$ which is based on $SK_{tk}$ with token, and then generates a new session key with token, $SK_{tk\_re}$, to encrypt the requested data using $SK_{tk\_re}$. In step 1015, the egress GW 310 sends $SK_{tk\_re}$, encrypted using the data requestor's 104 public key to the data requester 104.

In the case where the requested data is to be processed online, without transferring the data to the data requestor 104, in step 1016, the egress GW 310 may process the data online according to the data requester's 104 data process preferences. Once the egress GW 310 processes the data online, a report or summary may be sent to the data requestor 104. In the case where the requested data is to be processed offline by transferring the data to the data requestor 104, in step 1017, the egress GW 310 may send the requested data, encrypted using $SK_{tk\_re}$, to the data requestor 104. In some embodiments a combination of online and offline processing may be used, in which case both steps 1016 and 1017 may be used. Finally, in step 1018, the data requestor 104 may destroy data in accordance with $SK_{tk\_re}$ with token. Data may be destroyed when the token of $SK_{tk\_re}$ expires and $SK_{tk\_re}$ becomes invalid at which point the data may no longer be decrypted.

Embodiments allow for the PDACaaS to be customized to support a number of different applications and clients. Embodiments include multiple PDAC service architectures, multiple methods of data encryption and decryption, and multiple options for requested data to be processed by data requesters 104.

Customization of PDAC services allows for embodiments of PDACaaS to meet the needs of a large number of clients such as data providers 102 and data requestors 104. Clients may select or define service parameters to customize the PDACaaS for their particular service requirements and the types or characteristics of the data utilized. Some example of data types or characteristics are identification (ID) documents or ID related data, personal health related data or documents, investment data of individuals or businesses, social relation documents such as contact information data, financial or accounting information of individuals or businesses.

Each provisioned PDAC service can serve multiple data providers 102 or data requesters 104. Each data provider 102 can customize a preferred data protection level to be received from the PDAC service. A set of data protection levels may be specified for particular types of data. A set of data protection levels may include parameters such as architecture, encryption scheme, or privacy. Architectures may include a hierarchical PDACaaS architecture 400, a PDACaaS confederation architecture 500, or a hybrid of different architectures. Encryption (or cryptographic) key parameters may define the keys used for encryption and decryption of data, or whether to use a one-layer or two-layer encryption scheme. Privacy parameters may select between online of offline access for some or all of the data accessed.

As an example, for highly sensitive data such as identification documents managed by a government entity, a set of data protection levels could include a two-level, hierarchical PDACaaS architecture, a two-layer encryption scheme, and be limited to online access. For less sensitive data such as personal investment records, a set of data protection levels could include a single layer architecture 300 and allow for offline access by a data requestor 104.

A data provider 102 can select its preferred PDAC service based on the capabilities of available PDAC services. Data providers 102 can request specific features and parameters as part of the data upload method 900, and, in particular as part of the upload request received in step 901. The PDAC controller 302 can also determine the parameters for a data provider 102 based on protection level requirements, types of data, etc. sent be a client in the upload request in step 901.

In the field of data management, data classification as a part of an information lifecycle management process can be used as a tool to enable or help a PDAC service provider or database provider to determine what baseline security controls are appropriate for safeguarding that data. Each data provider 102 or data requestor 104 may have their own classification and there may also be defined classifications based on the type of industry or organization, such as commercial or government. Data classifications may include security level and data characteristics or type.

FIG. 11 illustrates data classification in security level, according to an embodiment of the present disclosure. As illustrated in FIG. 11, security levels for the classification of commercial data 1102 may include sensitive, confidential, private, proprietary, and public. Security levels for government data 1104 may include top secret, secret, confidential, sensitive, and unclassified.

FIG. 12 illustrates data classification in data characteristics, according to an embodiment of the present disclosure. As illustrated in FIG. 12, types of data used for commercial data 1102 may include business data, personal data, social data, health data, environment data, etc. Types of data used for government data 1104 may include personal identification data, military data, police or law data, community data, etc. Other classifications, security levels, etc. may be added or defined as required. In embodiments, the PDAC service may support an arbitrary number of criteria for classifying data and may pre-configure the criteria in ingress GWs 306 or egress GWs 310.

Embodiments provide for life cycle management for encryption keys that are used in the PDAC system. In particular, public/private key pairs, database encryption keys, and temporary session keys with tokens to limit their use may be supported and managed by the PDAC system.

After registering with the PDAC system a data provider 102 or a data requester 104 requester may have their own public/private key pair or the PDAC system's public key. The ingress GW 306 or egress GW 310 may also have their own public/private key pairs or the PDAC system's public key. Similarly, the PDAC system may store the public keys of system entities (e.g. data provider 102, data requestor 104, ingress GW 306, or egress GW 310). These public/private keys are used to sign or encrypt messages or negotiate session keys. In some embodiments, a system entity may store private keys protected by secure hardware. Public/private key pairs may also be set to expire after a predetermined amount of time or based on a criteria or event such as a hacking attempt being detected.

Figure 13B:
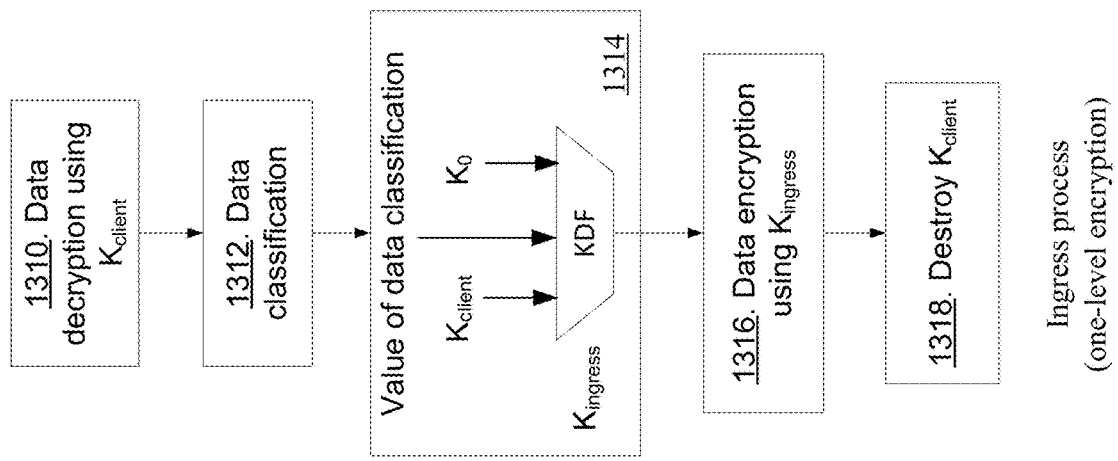
FIG. 13B illustrates key generation by an ingress GW when a one-level encryption method is used, according to an embodiment of the present disclosure.
Figure 13A:
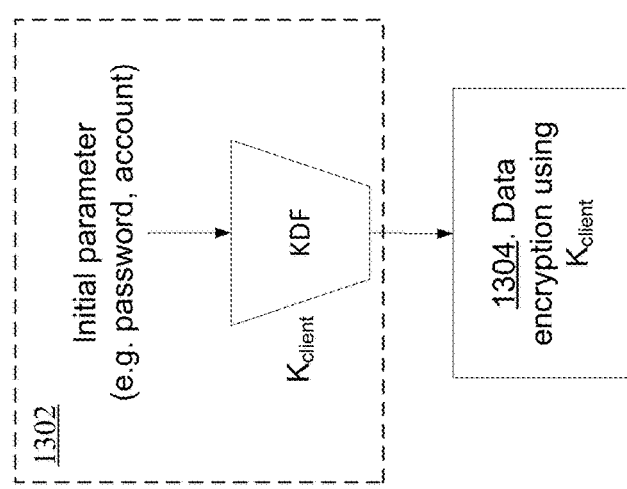
FIG. 13A illustrates how a public/private key pair may be generated for a data provider or a data requester, according to an embodiment of the present disclosure.

FIG. 13A illustrates how a public/private cryptographic key pair may be generated for a data provider 102 or a data requester 104 in an embodiment. At 1302, an initial parameter, such as a password or master key, may be supplied by a client or their agent and input to a key derivation function (KDF). At 1304, the results are client keys, $K_{client}$, that may be used to encrypt data and messages. The initial parameter is known only to the client and storage of private keys may be limited to the client's own hardware. $K_{client}$ may later be revoked to prevent access to data with the use of a token. Self-destructing data may also be implemented using techniques such as Self Destructing Data System (SeDaS), a Vanish system, or similar technology. Data self-destruction may be controlled by a token value that may be assigned by the data provider 102, their agent 110, or the PDAC system. Once the token value expires, $K_{client}$ is destroyed and data may not be easily decrypted. This feature enabled the data provider 102 to regain control over, or revoke, access to their data.

Embodiments include database encryption keys to prevent database provider 106 from accessing unencrypted data stored in the PDAC system. For increased security, especially when the database service provider 106 may be a cloud computing provider, database encryption keys may be time limited to a time based on the amount of time the data is expected to be stored in the database 112 and the amount of time that the data may be accessed by a data requestor 104. For example, a cryptographic key time limit may be set to 2 years when the database may be accessed for 2 years by authorized data requestors 104 or other entities. The longer the time encryption keys are valid for, or if they do not expire, the more secure the keys should be.

In embodiments, data encryption keys may be generated by the ingress GW 306 as illustrated in FIG. 13B. The ingress GW 306 may use a KDF that takes as inputs: $K_0$, where $K_0$ is a hardware-protected key specific to the ingress GW 306 and may be kept in a hardware security module (HSM) of the ingress GW 306; $K_{client}$, a second key from the data provider 102; and a value derived from a classification of data received from the data provider 102, where the value is determined by the ingress GW 306.

FIG. 13B also illustrates a one-level encryption method for sending data received from the data provider 102 to the database 112, according to an embodiment of the present disclosure. To start, data encrypted by the data provider 102 with $K_{client}$ of the data provider 102 is received by the ingress GW 306. At 1310, the ingress GW 306 uses $K_{client}$ to decrypt the received data. At 1312 the ingress GW 306 determines the classification of the decrypted data. At 1314, in the KDF of the ingress GW 306, the data classification is combined with $K_{client}$ and $K_0$, specific to the ingress GW 306 itself, to produce cryptographic (encryption) key pair, $K_{ingress}$. At 1316, the ingress GW 306 utilizes $K_{ingress}$ to encrypt the data for transmission. Finally, at 1318, $K_{client}$ is destroyed to prevent any further use of $K_{client}$.

FIG. 13C illustrates a two-level encryption method for sending data received from the data provider 102 to the database 112, according to an embodiment of the present disclosure. At 1320, a data classification is obtained by the ingress GW 306. At 1322, in the KDF of the ingress GW 306, the data classification is combined with $K_{client}$ and $K_0$, specific to the ingress GW 306 itself, to produce cryptographic (encryption) key pair, $K_{ingress}$. At 1324, the ingress GW 306 utilizes $K_{ingress}$ to encrypt the data for transmission.

FIG. 13D illustrates a two-level decryption method for sending data received from the database 112 and sending it to a data requester 104, according to an embodiment of the present disclosure. At 1330, a data classification is obtained by the egress GW 310. At 1332 in the KDF of the egress GW 310, the data classification is combined with $K_0$, where $K_0$ is a hardware-protected key specific to the egress GW 310 itself and a second key $K_{client}$, to produce cryptographic (decryption) key pair, $K_{egress}$. At, 1334, the egress GW 310 utilizes $K_{egress}$ to decrypt the data once. Then, at 1336, the egress GW 310 utilizes $K_{client}$ to decrypt the data once more for transmission to the data requester 104. Finally, at 1338, $K_{client}$ is destroyed to prevent any further use of $K_{client}$.

Figure 13E:
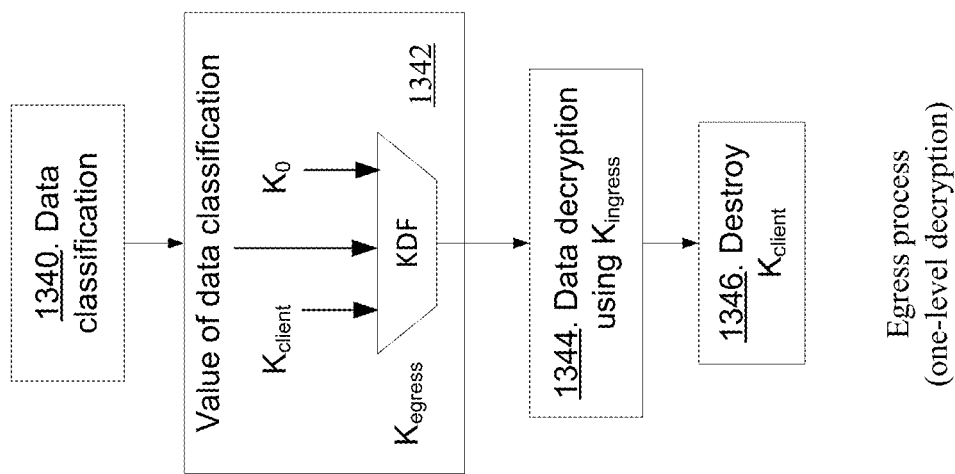
FIG. 13E illustrates key generation by an egress GW when a two-level encryption method is used, according to an embodiment of the present disclosure.

FIG. 13E illustrates a one-level decryption method for sending data received from the database 112 and sending it to a data requester 104, according to an embodiment of the present disclosure. At 1340, a data classification is obtained by the egress GW 310. At 1342, in the KDF of the egress GW 310, the data classification is combined with $K_0$, specific to the egress GW 310 itself and second key $K_{client}$, to produce cryptographic (decryption) key pair, $K_{egress}$. At 1344, the egress GW 310 utilizes $K_{egress}$, received from the ingress GW 306 to decrypt the data for transmission to the data requester 104. Finally, at 1346, $K_{client}$ is destroyed to prevent any further use of $K_{client}$.

Temporary session keys may be negotiated between the egress GW 306 and the data requester 104, or between a data provider 102 and the ingress GW 306, to encrypt data. This session key may be encrypted using public keys.

Figure 14:
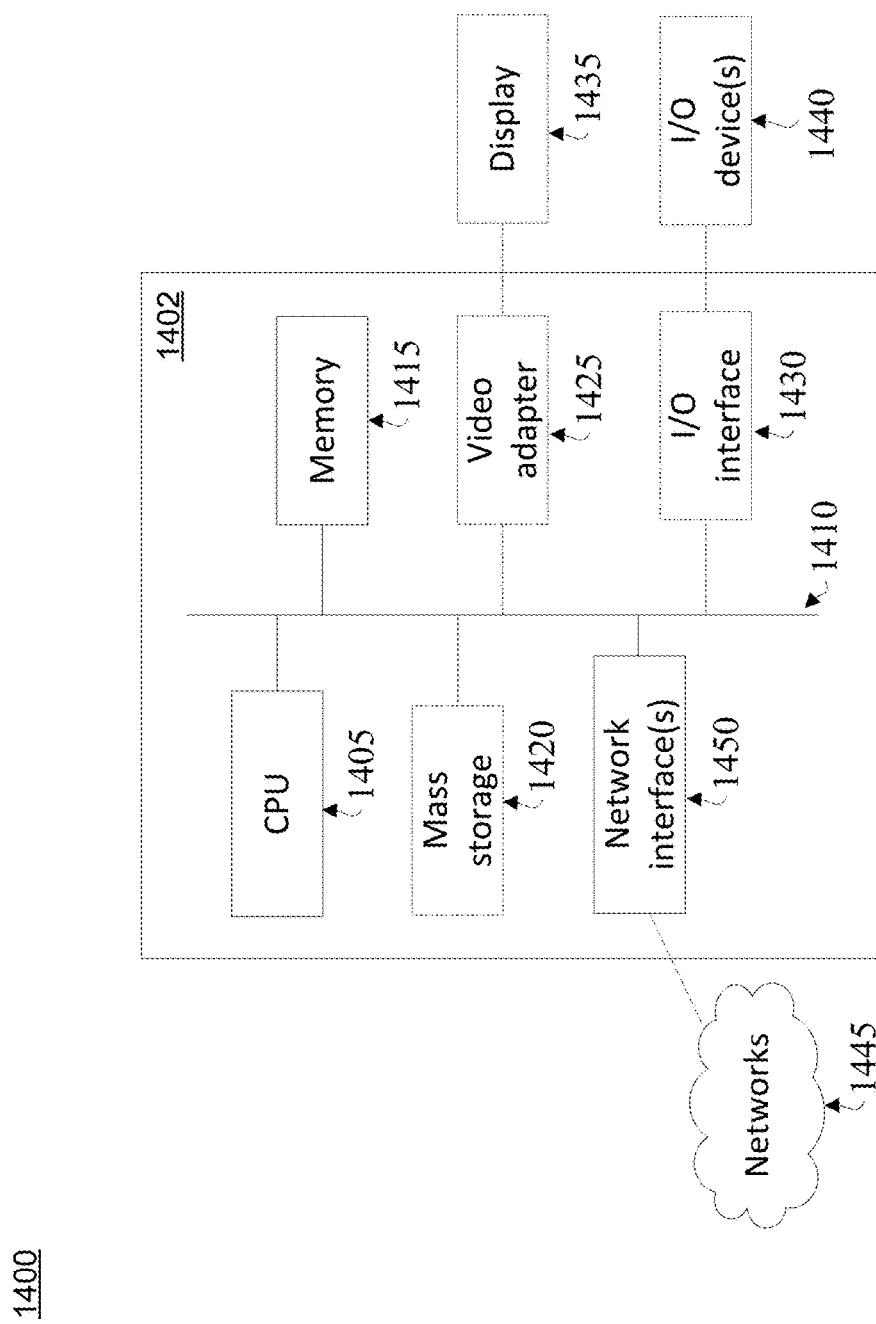
FIG. 14 illustrates a block diagram of a computing system used to implement a PDAC system, according to an embodiment of the present disclosure.

FIG. 14 is a block diagram of a computing system 1400 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit 1402 typically includes a central processing unit (CPU) 1405, a bus 1410 and a memory 1415, and may optionally also include a mass storage device 1420, a video adapter 1425, and an I/O interface 1430 (shown in dashed lines).

The CPU 1405 may comprise any type of electronic data processor. The memory 1415 may comprise any type of non-transitory system memory such as static random access memory (SRAM), dynamic random access memory (DRAM), synchronous DRAM (SDRAM), read-only memory (ROM), or a combination thereof. In an embodiment, the memory 1415 may include ROM for use at boot-up, and DRAM for program and data storage for use while executing programs. The bus 1410 may be one or more of any type of several bus architectures including a memory bus or memory controller, a peripheral bus, or a video bus.

The mass storage 1420 may comprise any type of non-transitory storage device configured to store data, programs, and other information and to make the data, programs, and other information accessible via the bus 1410. The mass storage 1420 may comprise, for example, one or more of a solid state drive, hard disk drive, a magnetic disk drive, or an optical disk drive.

The video adapter 1425 and the I/O interface 1440 provide optional interfaces to couple external input and output devices to the processing unit 1402. Examples of input and output devices include a display 1435 coupled to the video adapter 1425 and an I/O device 1440 such as a touch-screen coupled to the I/O interface 1430. Other devices may be coupled to the processing unit 1402, and additional or fewer interfaces may be utilized. For example, a serial interface such as Universal Serial Bus (USB) (not shown) may be used to provide an interface for an external device.

The processing unit 1402 may also include one or more network interfaces 1450, which may comprise wired links, such as an Ethernet cable, and/or wireless links to access one or more networks 1445. The network interfaces 1450 allow the processing unit 1402 to communicate with remote entities via the networks 1445. For example, the network interfaces 1450 may provide wireless communication via one or more transmitters/transmit antennas and one or more receivers/receive antennas. In an embodiment, the processing unit 1402 is coupled to a local-area network or a wide-area network for data processing and communications with remote devices, such as other processing units, the Internet, or remote storage facilities.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system for providing a networked database service, the system comprising:
    a controller configured to:
        receive one or more data requests; and
        authenticate the one or more data requests; and
    an ingress gateway (GW) in communication with the controller for processing a data upload request; and
    an egress GW in communication with the controller for processing a data access request from a data requester;
    wherein
    the ingress GW stores an ingress GW hardware-protected key and is configured to:
        receive, from the controller, a response corresponding to at least one of the one or more data requests wherein the one or more data requests includes a data upload request;
        receive a data provider key from a data provider;
        receive encrypted data from the data provider; and
        perform data classification on the encrypted data according to the response to obtain a classification result;
        generate a cryptographic key for accessing a database, the cryptographic key using the classification result, the ingress GW hardware-protected key, and the data provider key; and
        process the encrypted data using the cryptographic key to obtain the second encrypted data, and send the second encrypted data to a database for storage according to the data upload request; and
    the egress GW stores an egress GW hardware-protected key and is configured to:
        receive a data indication from the controller;
        perform data classification on the data indication to obtain a second classification result
        receive the second encrypted data from the database; and
        generate a decryption key using the second classification result, the hardware-protected key of the egress GW, and the data provider key; and
        decrypt the second encrypted data based on the decryption key, and provide the decrypted data to the data requester;
    wherein the controller and the database are operated by different parties.

2. The system of claim 1, wherein the ingress GW is further configured to send the data upload request to the controller.

3. The system of claim 1, the controller is further configured to perform authentication and authorization on the data access request, and send the data indication to the egress GW, wherein the data indication includes:
    an ID of the data requester;
    the data requester's public key;
    a session key generated by the data provider which is used to encrypt the data provider key sent from the data provider; and
    the session key encrypted using the egress GWs's public key.

4. The system of claim 3 wherein the controller is configured to perform the authorization on the data access request by:

confirming with the data provider that the data access request is authorized comprising:
sending a data access request to the data provider,
receiving a data access response from the data provider.

5. The system of claim 3 wherein the ingress GW, the egress GW and the controller are operated by the same party, which differs from the party operating the database.

6. The system of claim 1 wherein the ingress GW is further configured to
decrypt the encrypted data from the data provider using the data provider key to obtain decrypted data,
encrypt the decrypted data using the cryptographic key to obtain the second encrypted data.

7. The system of claim 1 wherein the egress GW is further configured to decrypt the second encrypted data from the database using the decryption key to obtain a second decrypted data; and
decrypt the second decrypted data using the data provider key to obtain decrypted data.

8. The system of claim 1 wherein the ingress GW is further configured to process the encrypted data by encrypting the encrypted data using the cryptographic key to obtain the second encrypted data.

9. The system of claim 1 wherein the the ingress GW and egress GW are part of a plurality of first layer GWs, each first layer GW associated with a database provider, the system further comprising a second layer GW to provide a multi-layer architecture using the controller to provide different levels of security while appearing as a single layer architecture to a data provider or date requester.

10. An ingress gateway (GW) apparatus comprising:
a processor;
at least one network interface;
non-transitory machine readable memory storing machine readable instructions which
when executed by the processor, configures the ingress GW to:
store an ingress GW hardware-protected key;
receive data upload request from a data provider;
receive a data provider key from the data provider;
send the data upload request to a controller;
receive a response corresponding to the data request from the controller;
receive encrypted data from the data provider;
perform data classification on the received encrypted data according to the response to obtain a classification result;
generate a cryptographic key using the classification result, the ingress GW hardware-protected key, and the data provider key from the data provider;
encrypt the encrypted data using the cryptographic key to obtain a second encrypted data; and
send the second encrypted data to the database for storage;
wherein the database and the GW are operated by different parties.

11. The ingress GW apparatus of claim 10 wherein the ingress GW is further configured to:
decrypt the encrypted data from the data provider the data provider key to obtain decrypted data; and
encrypt the decrypted data using the cryptographic key to obtain the second encrypted data.

12. The ingress GW apparatus of claim 10 wherein the ingress GW is configured to send the second encrypted data to the database for storage by sending the second encrypted data via a data distribution center to the database for storage.

13. The ingress GW apparatus of claim 10 wherein the response is an authentication of the data provider.

14. The ingress GW apparatus of claim 10 wherein the encrypted data is encrypted using the data provider key provider, and the ingress GW is further configured to further encrypt the encrypted data using the cryptographic key.

15. The ingress GW apparatus of claim 10 wherein the ingress GW and the controller are operated by the same party, which differs from the party operating the database.

16. An egress gateway (GW) apparatus comprising:
a processor;
at least one network interface;
non-transitory machine readable memory storing machine readable instructions which
when executed by the processor, configures the egress GW to:
store an egress GW hardware-protected key;
receive a data access request from a data requester for data associated with a data provider;
receive a data provider key from the data provider;
send the data access request to a controller for authentication and authorization;
receive a data indication from the controller;
perform data classification on the received data indication to obtain a second classification result;
receive second encrypted data from the database associated with the data access request; and
generate a decryption key using the second classification result, the egress GW hardware-protected key, and the data provider key; and
decrypt the second encrypted data based on the decryption key to obtain decrypted data, and provide the decrypted data to the data requester;
wherein the database and the GW are operated by different parties.

17. The egress GW apparatus of claim 16 wherein the egress GW is configured to decrypt the second encrypted data by performing a decryption of the second encrypted data using the decryption key and the data provider key.

18. The egress GW apparatus of claim 16 wherein the egress GW and the controller are operated by the same party, which differs from the party operating the database.

* * * * *